United States Patent
Miyashita et al.

[11] Patent Number: 5,877,797
[45] Date of Patent: Mar. 2, 1999

[54] INK-JET PRINTING APPARATUS AND METHOD FOR PRINTING ON MIXED FIBER TEXTILES

[75] Inventors: Yoshiko Miyashita; Yasushi Miura, both of Kawasaki, Japan

[73] Assignee: Canon Kabushiki Kaisha, Tokyo, Japan

[21] Appl. No.: 579,847

[22] Filed: Dec. 28, 1995

[30] Foreign Application Priority Data

Dec. 29, 1994 [JP] Japan ................... 6-340265
Dec. 25, 1995 [JP] Japan ................... 7-337583

[51] Int. Cl.⁶ .................................................. B41J 3/407
[52] U.S. Cl. ........................... 347/106; 347/6; 347/19
[58] Field of Search ................. 347/106, 51, 6, 347/14, 19

[56] References Cited

U.S. PATENT DOCUMENTS 5,089,712 2/1992 Holland .................. 250/557

FOREIGN PATENT DOCUMENTS

| 62-053492 | 3/1987 | Japan . |
| 62-057750 | 12/1987 | Japan . |
| 63-031594 | 6/1988 | Japan . |
| 3046589 | 7/1991 | Japan . |
| 4-18358 | 1/1992 | Japan . |
| 5-318721 A | 12/1993 | Japan ................... 347/106 |
| 7117223 | 5/1995 | Japan . |

*Primary Examiner*—Shawn Riley
*Attorney, Agent, or Firm*—Fitzpatrick, Cella, Harper & Scinto

[57] ABSTRACT

Corresponding to kinds of respective fibers forming of a cloth, a masking coefficient is selected in a masking coefficient storage memory. A masking coefficient is synthesized depending upon a ratio of respective fibers forming the cloth. By this, a masking coefficient is optimized as image processing parameter and thus appropriate color development characteristics can be attained in printing on a mixed fiber cloth or so forth.

27 Claims, 15 Drawing Sheets

INK-JET PRINTING APPARATUS AND METHOD FOR PRINTING ON MIXED FIBER TEXTILES

BACKGROUND OF THE INVENTION

1. Field of the Invention

The present invention relates generally to an ink-jet printing apparatus and an ink-jet printing method. More specifically, the invention relates to an ink-jet printing apparatus performing printing by ejecting an ink to a cloth.

2. Description of the Related Art

As a typical textile printing apparatus, there are known apparatuses which employ a roller textile printing method for forming a continues pattern by impressing or carving a pattern on a peripheral surface of a roller and pressing the roller on a material cloth, or employ a screen textile printing method for directly printing a desired image on the cloth or so forth by preparing screens for a number corresponding to colors and patterns to be overlaid.

Such textile printing apparatus employing the roller textile printing method or the screen textile printing method requires large amount of process steps and working days in preparation of the roller or the screens. Furthermore, such textile printing apparatus requires a lot of operations in preparing respective colors of inks required for printing, indexing of the roller or the screens. Also, size of such apparatus is large, and becomes further larger in proportion to a number of colors to be used in the apparatus to require relatively large space for installation. Furthermore, a storage space for the roller or the screens also becomes necessary.

On the other hand, an ink-jet type printing apparatus to be used as a printing device of a printer, a copy machine, a facsimile and so forth or as an output device of a composite type electronic equipment including a computer, a wordprocessor and so forth, workstation and so forth has been practiced. There is a proposal for employing such ink-jet type printing apparatus for performing textile printing by directly ejecting an ink to a cloth, as disclosed in Japanese Patent Application Publication Nos. 57750/1987 and 31594/1988, for example.

The ink-jet type printing apparatus performs printing by ejecting the ink to a medium to be printed (hereinafter referred to as printing medium). The ink-jet type printing apparatus holds various advantages in that an ink-jet head can be made compact easily, high definition image can be printed at high speed, a running cost is low, a noise level is low for non-impact type printing, a multi-color printing employing a plurality of colors of inks can be done easily, and so forth.

Particularly, an ink-jet head of the type ejecting the ink utilizing a thermal energy can be easily produced with a high density liquid path arrangement (a high density orifice arrangement) by forming an electrothermal transducer element, an electrode, a liquid path wall, an upper plate and so forth by employing a semiconductor fabrication process, such as etching, deposition, sputtering and so forth. Therefore, further down-sizing of the ink-jet head can be achieved.

However, when a cloth is employed as the printing medium in the ink-jet printing apparatus for textile printing, various technical problems are naturally arisen.

For example, the following problems are arisen in the textile printing employing ink-jet type printing technology.

The cloth as generally referred to includes wide variety including natural fiber, such as cotton, silk, wool and so forth, or synthetic fiber, such as nylon, polyester, acryl and so forth. Depending on the kind of the cloth, property and characteristics associated with textile printing is inherently differentiated.

A relationship between dye and dye-affinity of the fibers is shown in the following table 1. As can be clear from the table 1, for cloths of the fibers having the same or similar dye-affinity, the same adapted ink may be employed, whereas when the cloth is fabricated from fibers having different dye-affinity, such as mixed fiber spinning of nylon and cotton, it is desirable to use a plurality of different inks respectively adapted to respective fibers.

| | DYE AND DYE-AFFINITY OF FIBER | | | | | | | | | |
|---|---|---|---|---|---|---|---|---|---|---|
| Dye<br>Fiber | Direct | Acid | Complex<br>Salt | Salt<br>Base<br>(Cation) | Acid<br>Mordant | Vat | Sulfidi-<br>zation | Naphthol | Dispersion | Reaction | Pigment |
| Cotton,<br>Hemp,<br>Rayon | ○ | | | | | ◎ | ◎ | ◎ | | ◎ | ◎ |
| Wool, Silk | ○ | ◎ | ◎ | ○ | ◎ | | | | | ○ | ○ |
| Acetate | | ○ | | | | ○ | | ○ | ◎ | | ○ |
| Nylon | ○ | ◎ | ◎ | ○ | ◎ | | | ○ | ○ | ○ | ○ |
| Polyester | | | | | | | | | ◎ | | ○ |
| Acryl | | ○ | ○ | ◎ | | | | | ○ | | ○ |
| Vinylon | ○ | | | ○ | | ○ | ○ | ◎ | ○ | | ○ |

◎: high dye-affinity is shown
○: can be dyed

For this, it is possible to consider to repeat printing operation for the number of kinds of fibers having different dye-affinity with exchanging inks to be used. However, it requires maintaining precision in positioning with respect to the printing medium and causes a complicated exchanging operation of the inks to cancel convenience of the ink-jet textile printing apparatus.

In contrast to this, Japanese Laid-Open Patent Application No. 7-117223, for example, proposes a method for printing the same image on the printing medium with employing a plurality of ink-jet heads which can eject a plurality of kinds of inks for fibers having mutually different dye-affinity, with the same tone.

However, even when the ink and the fiber is adapted for the inks of the same tone in view of dye-affinity as set for above, color development should be differentiated depending upon combination of the dye used in the ink and the fiber.

Therefore, even when printing is performed for the same image, it is not possible to always obtain the same tone with different combination. In this case, it becomes difficult to expect the tone of the overall textile print product to perform color matching.

It is considered to perform color matching of the textile print product by performing adjustment and setting of the parameter on the image processing adapting to various conditions depending upon the cloth to be used. However, the conditions, such as kind of fiber, fiber mixing ratio, texture constituting the cloth are different depending upon application. Therefore, parameter adjusting operation on the image processing associated with color matching becomes complicated.

SUMMARY OF THE INVENTION

It is an object of the present invention to provide an ink-jet printing apparatus and an ink-jet printing method which facilitate to obtain desired color taste in a textile product when textile printing is performed for cloth made from a plurality of kinds of fibers.

Another object of the present invention is to provide an ink-jet printing apparatus and an ink-jet printing method which can make color development characteristics in a printing medium appropriate by obtaining an image processing parameter on a basis of the image processing parameter of each of components forming the printing medium and a component ratio of the components.

In a first aspect of the present invention, there is provided an ink-jet printing apparatus employing an ink-jet head ejecting an ink, for performing printing by ejecting the ink from the ink-jet head to a printing medium consisted of a plurality of component materials having different characteristics relative to the ink, the apparatus comprising:

image processing means for performing process for converting an input image signal into an ejection signal for the ink-jet head; and parameter generating means for generating an image processing parameter relating to the printing medium on a basis of kind of the printing medium.

In a second aspect of the present invention, there is provided an ink-jet printing apparatus employing an ink-jet head ejecting an ink, for performing printing by ejecting the ink from the ink-jet head to a printing medium consisted of a plurality of component materials having different characteristics relative to the ink, the apparatus comprising:

image processing means for performing process for converting an input image signal into an ejection signal for the ink-jet head;

a memory for storing an image processing parameter in the image processing means per each of component materials which can constitute the printing medium;

selection means for selecting respective image processing parameters for each of the plurality of component materials consisting the printing medium to be used in printing, from the image processing parameters stored in the memory; and parameter generating means for generating an image processing parameter relating to the printing medium on a basis of the respective image processing parameters selected by the selection means and a component ratio of respective component materials in the printing medium.

In a third aspect of the present invention, there is provided an ink-jet printing apparatus employing an ink-jet head ejecting an ink, for performing printing by ejecting the ink from the ink-jet head to a printing medium, the apparatus comprising:

image processing means for performing process for converting an input image signal into an ejection signal for the ink-jet head;

a memory for storing the image processing parameter in the image processing means per each of component materials which can constitute the printing medium;

judgement means for making judgement whether the printing medium to be used in printing is consisted of a plurality of component materials having different characteristics relative to the ink or not;

selection means for selecting respective image processing parameters for each of the plurality of component materials consisting the printing medium to be used in the printer, from the image processing parameters stored in the memory, when the judgement means make judgement that the printing medium is consisted of the plurality of component materials; and parameter generating means for generating an image processing parameter relating to the printing medium on a basis of the respective image processing parameters selected by the selection means and a component ratio of respective component materials in the printing medium.

In a fourth aspect of the present invention, there is provided an ink-jet printing apparatus employing an ink-jet head ejecting an ink, for performing printing by ejecting the ink from the ink-jet head to a printing medium consisted of a plurality of component materials having different characteristics relative to the ink, the apparatus comprising:

print control means for scanning a plurality of ink-jet heads ejecting inks respectively having the same tone and different composition to the same region of the cloth and for differentiating a total amount of the ink ejected from the plurality of ink-jet heads between scanning.

In a fifth aspect of the present invention, there is provided an ink-jet printing method employing an ink-jet head ejecting an ink, for performing printing by ejecting the ink from the ink-jet head to a printing medium, comprising the steps of:

preparing the printing medium;

making judgement whether the printing medium is consisted of a plurality of component materials having different characteristics relative to the ink or not;

performing image processing on a basis of image processing parameter determined with respect to each of the plurality of component materials and a component ratio of the plurality of component materials in the printing medium; and performing printing on a basis of a result of image processing.

In a sixth aspect of the present invention, there is provided a printed product obtained by ejecting an ink to a cloth consisted of a plurality of fibers having different characteristics with respect to the ink, wherein a plurality of kinds of dots are formed by inks respectively having the same tone and different components, and number of the plurality of kinds of dots are in a given ratio.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of an ink-jet printing apparatus and an ink-jet printing method according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to not necessarily obscure the present invention.

First Embodiment (1) Overall Construction of System

Figure 1:
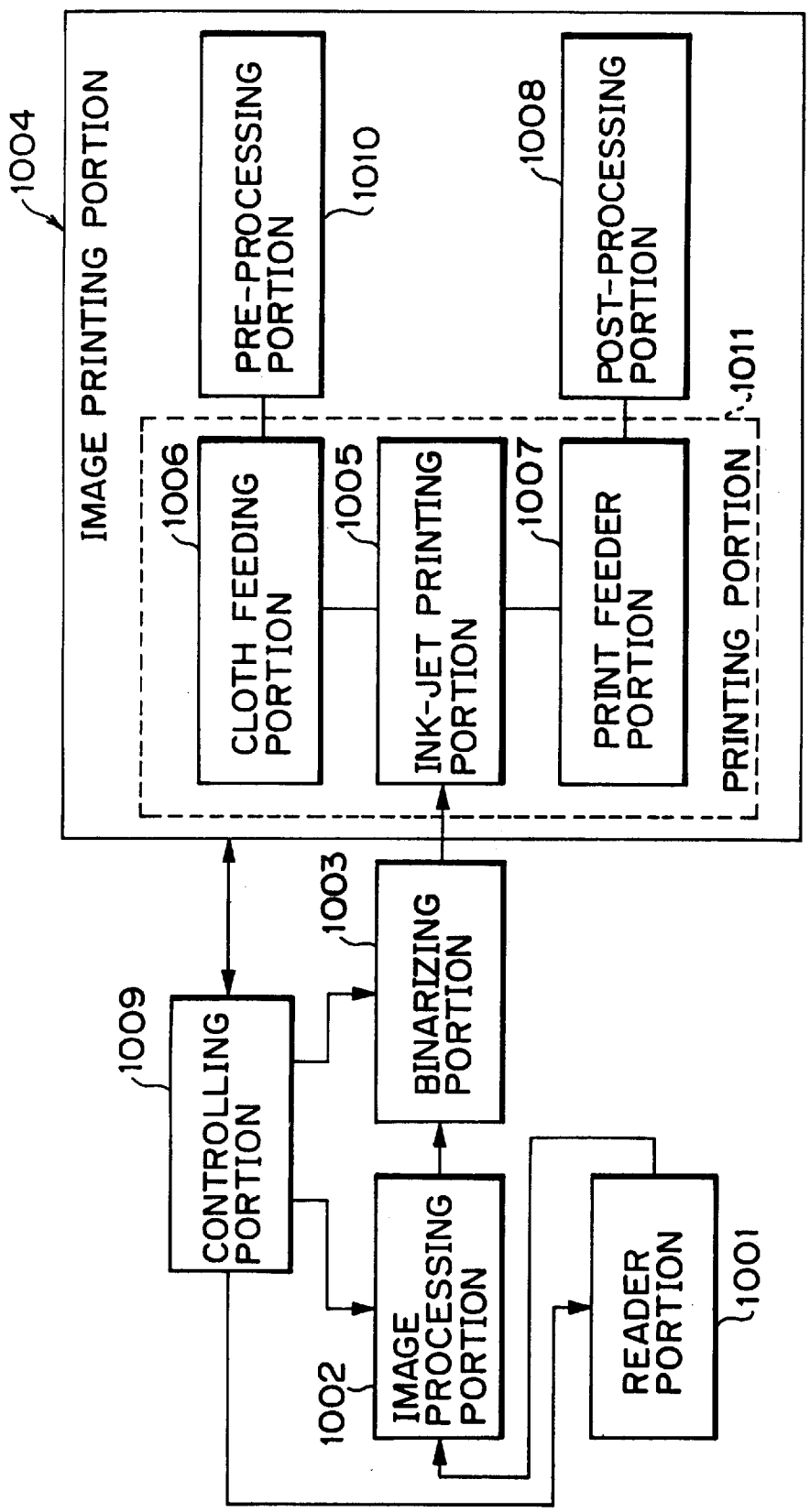
FIG. 1 is a block diagram showing an overall construction of an embodiment of a textile printing system according to the present invention.

FIG. 1 is an illustration showing overall construction of one embodiment of a textile printing system according to the present invention. The textile printing system includes a reader portion 1001 for reading an original image prepared by a designer or so forth, an image processing portion 1002 for processing an original image data read by the reader portion 1001, a binarization processing portion 1003 for binarizing an image data prepared by the image processing portion 1002, and an image printing portion 1004 for printing an image on a cloth on a basis of a binary image data.

In the reader portion 1001, the original image read by a CCD image sensor is output to the image processing portion 1002 as an electric signal. In the image processing portion 1002, a printing data is generated for driving ink-jet printing portion 1005 ejecting later-mentioned inks of four colors, i.e. magenta, cyan, yellow and black on a basis of an input original image data. Upon generation of the printing data, image processing for reproducing the original image with dots of the ink, and selection of coloration of tone, size of the image, such as modification, expansion and reduction of layout, are performed.

The image printing portion 1004 is constructed with a pre-processing portion 1010 for providing a pre-processing for the cloth, on which printing is performed, a post-processing portion 1008 for performing post process for the printed cloth and storing the printed cloths, and a printing portion 1011 performing printing process for the cloths. Furthermore, the printing portion 1011 is constructed with an ink-jet printing portion 1005 for ejecting ink depending on the printing data, a cloth feeding portion 1006 for feeding the cloth to the ink-jet printing portion, a print transporting portion 1007 provided in opposition to the ink-jet printing portion 1005 for precisely feeding the cloth. It should be noted that the construction of the image printing portion 1004 will be discussed below with reference to FIG. 2 and so forth.

(2) Explanation of Printing Mechanism.

As the shown embodiment of the image printing portion 1004, the operation of a serial type ink-jet printing apparatus will be discussed with reference to FIG. 2.

Figure 2:
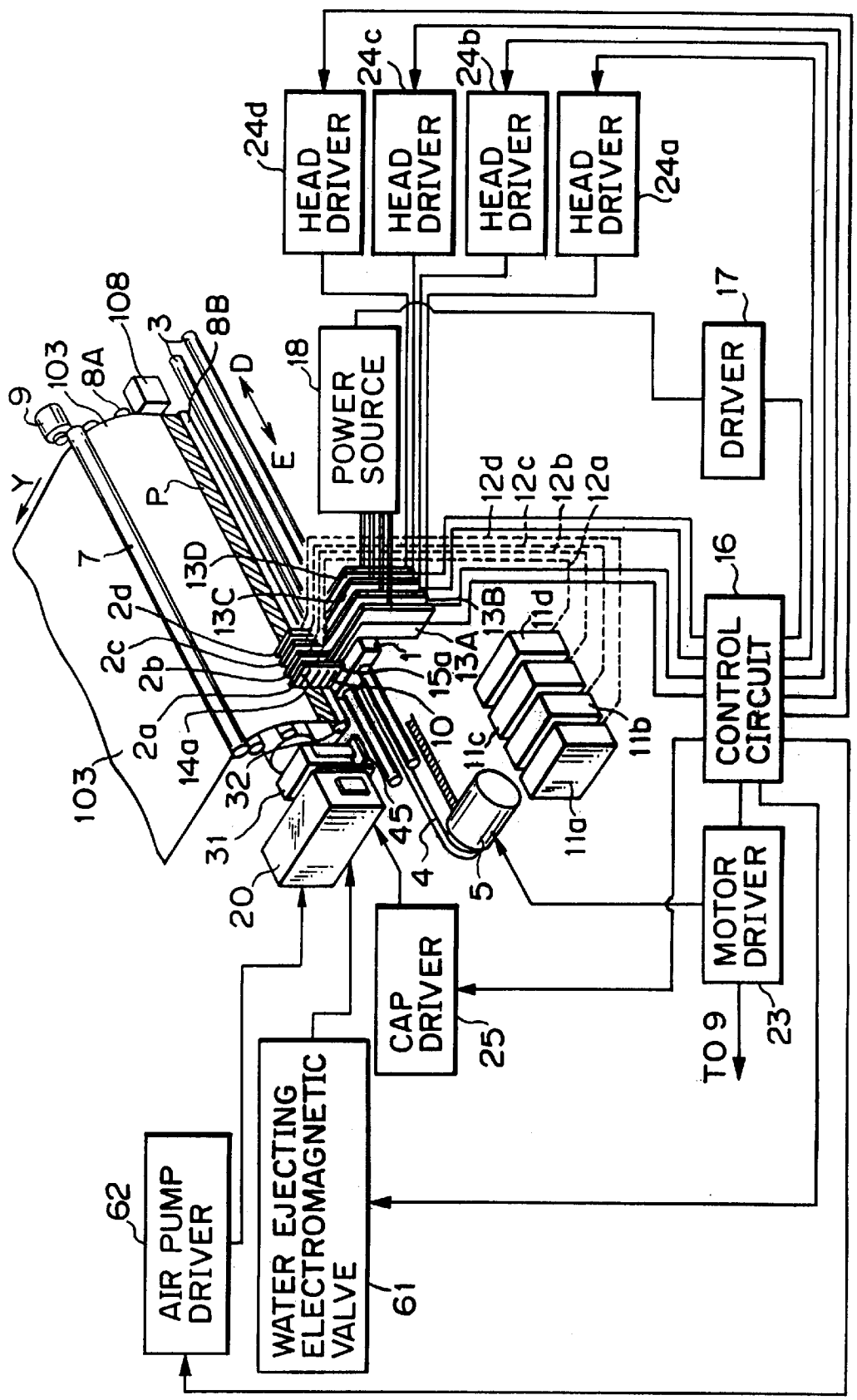
FIG. 2 is a perspective view showing general and mechanical construction of an ink-jet printing portion applied to the embodiment of the textile printing system.

In FIG. 2, a carriage 1 mounts ink-jet heads (hereinafter also referred to as printing head or simply as head) 2a, 2b, 2c and 2d for color printing corresponding to cyan (C), magenta (M), yellow (Y) and black (BK), respectively. A guide shaft 3 supports a carriage 1 in movable fashion. It should be noted that while it is neglected from illustration for simplification, the carriage 1 may mount four heads for special colors and mechanisms associated therewith are provided. Each head may be detachable with respect to the carriage per each individual head or per a group of several individual heads.

Here, the special color is a color which cannot be expressed by color mixing of Y, M, C and Bk to be employed in normal printing operation or which is a specifically provided color as a single color for particularly clear expression of the color. Employing inks and the heads of these special colors makes it possible to print an image of these special colors. Typically, colors of blue, orange and so forth are frequently included in the color printing image. Therefore, by employing these colors as special colors, excellent quality of color image can be printed.

A belt 4, as an endless belt, is fixedly connected to a part of the carriage 1. Also, the belt 4 is wound around a gear mounted on a drive shaft of a carriage driving motor 5 (driven by a motor driver 23) as a pulse motor. By driving the carriage driving motor 23, the belt 4 wound around the drive shaft driven by the carriage driving motor, can be driven to travel. As a result, the carriage 1 can scan the printing surface of the printing medium.

Also, a transporting roller 7 for transporting the printing medium 103 (i.e. the printing paper or cloth) and rollers 8A and 8B for guiding the printing medium 103 and a printing medium transporting motor 9 are provided.

In each printing head 2a, 2b, 2c and 2d and the printing head for special color, 256 ejection openings for ejecting ink droplet toward the printing medium 103 are provided in a density of 400 DPI (dot/inch). For respective printing heads 2a, 2b, 2c and 2d (and further for the special color heads), inks are supplied from respectively corresponding ink tanks 11a, 11b, 11c and 11d (and also for ink tanks for the special colors) via supply tubes 12a, 12b, 12c and 12d (and further special color supplying tubes). Then, for an energy generating means (not shown) provided in a liquid path communicated with each ejection opening, ink ejection signal is selectively supplied from each head driver 24a, 24b, 24c and 24d via flexible cable 13a, 13b, 13c and 13d, respectively.

Also, in each printing head 2a, 2b, 2c, 2d or the like, a head heater 14a, 14b, 14c and 14d or the like (14b, 14c and 14d are not illustrated) and a temperature detecting means 15a, 15b, 15c and 15d or the like (15b, 15c, and 15d are not illustrated) are provided. Detection signals from the temperature detecting means 15a, 15b, 15c, 15d and so forth are input to a control circuit 16 having a CPU. The control circuit 16 controls heating of the head heater 14a, 14b, 14c, 14d and so forth via a driver 17 and a power source 18 on the basis of this signal.

A capping means 20 is adapted to contact with the ejection opening surface of respective printing heads 2a, 2b, 2c, 2d and so forth during non-printing state to prevent the ink from drying and preventing foreign manner from mixing with the ink, or to perform removal thereof. In concrete, during non-printing state, the printing heads 2a, 2b, 2c and 2d move to the position opposing to the capping means 20. The capping means 20 is driven forward by a cap driver 25 to depress an elastic member 44 onto the ejection opening surface for capping. It should be noted that while neglected from illustration, when the special color head is provided, the capping means for the special head is provided.

A plugging preventing means 31 is adapted to receive ejected ink when the printing heads 2a, 2b, 2c and 2d perform a preliminary ejecting operation. The plugging preventing means 31 includes a liquid receptacle member 32 mating with the printing heads 2a, 2b, 2c, 3d and so forth and receiving and absorbing the ink ejected in the preliminary ejection operation. The plugging preventing means 31 is provided between the capping means 20 and a printing start position. It should be noted that as a material of the liquid receptacle member 32 and a liquid holding member 45, sponge like porous member or plastic sintered body and so forth are effective.

Figure 3:
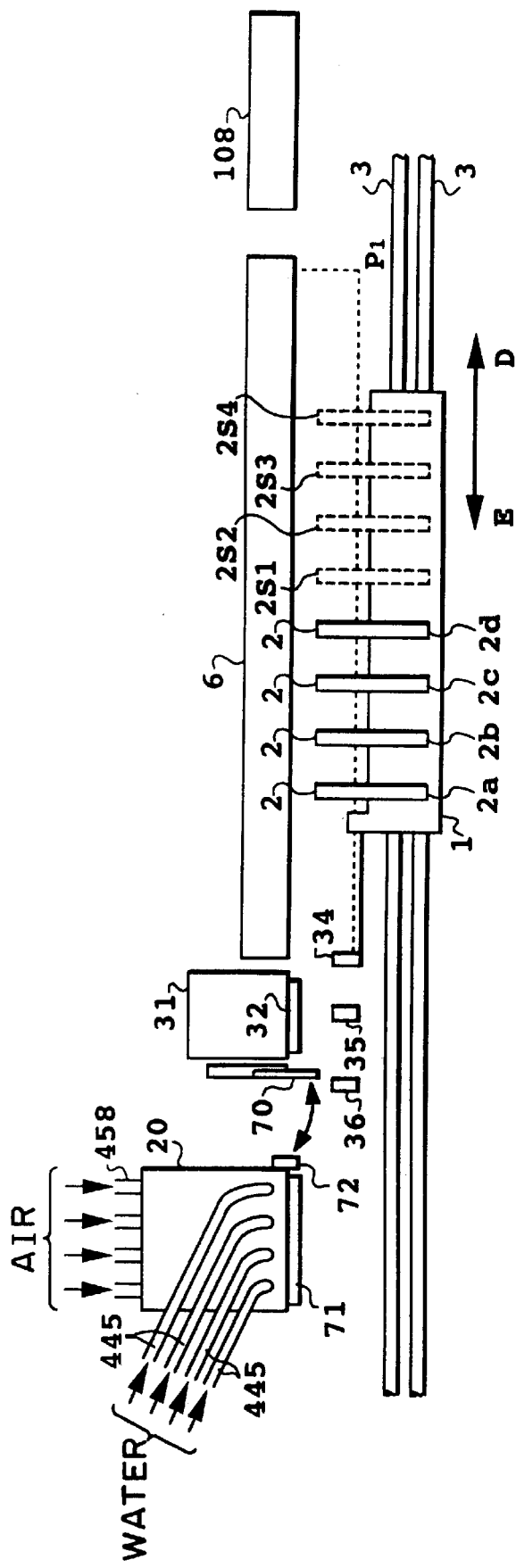
FIG. 3 is a plan view of the ink-jet printing portion.

To the capping member 20, a water ejecting electromagnetic valve 61 for water ejection and an air pump driver 62 are connected. The water ejecting electromagnetic valve 61 and the air pump driver 62 drives ejection nozzles arranged in the capping means for ejecting washing water and discharging air under control of the control means 16. FIG. 3 is a plan view for explaining operation of the shown embodiment of the printing head. The elements common to FIG. 2 will be represented by the same reference numerals and a discussion thereof will be neglected for simplification of disclosure to facilitate clear understanding of the invention.

In FIG. 3, a print starting detection sensor 34 and a capping means detecting sensor 36 are for detecting respective positions of respective printing heads 2a, 2b, 2c, 2d. Also, a preliminary ejection position detecting sensor 35 detects a reference position of the preliminary ejection operation performed by the printing heads 2a, 2b, 2c and 2d during movement in scanning direction.

Also, a reference numeral 108 denotes a head characteristics measuring means to be used for shading correction, which includes a feeding means for feeding the printing medium or so forth printed with a test pattern for head shading by the head to be tested, and a reading means for reading the information thereon. As the head characteristics measuring means, the means disclosed in a commonly owned Japanese Patent Application Laid-open No. 18358/1992, particularly that illustrated in FIG. 31 may be employed, for example.

Next, discussion will be given for an ink-jet printing operation.

At first, in the printing stand-by state, the printing heads 2a, 2b, 2c and 2d are capped by the capping means 20. When a printing signal is input to the control circuit 16, the motor 5 is driven by the motor driver 23 to start movement of the carriage. Associating with this movement, when respective printing heads are detected by the preliminary ejection position detecting sensor 35, ejection of ink from each printing head toward the plugging preventing means 31 is performed as a preliminary ejection for a given period. Thereafter, the carriage 1 is again driven in the direction of an arrow D. When the print start detecting sensor detects the carriage, an electro-thermal converting element of respective ejection openings of the printing heads 2a, 2b, 2c and 2d are driven selectively. By this, an ink droplet is ejected to print the image on the printing width portion p of the printing medium 103 in dot matrix pattern. Thus, an image of the given width p (determined by distance between adjacent ejection openings in the vertical direction of the printing head and number of nozzles arranged in the vertical direction) is printed, and then the carriage 1 reaches the right side end in the drawing (the right side end position can be detected by counting number of pulses applied to the motor 5). When detecting the printing head at the right side end position, a number of pulses corresponding to the width of the printing heads is applied so that the printing head 2a located at the rear end of the carriage 1 may fully move across the printing medium. Subsequently, the scanning direction of the carriage is reversed to be driven in the direction of arrow E to return to the position for the preliminary ejection. In conjunction therewith, the printing medium is fed in the direction of arrow F for an amount corresponding to the printing width p or more. Then, the foregoing printing operation is repeated.

(3) Explanation of Construction of Apparatus

Figure 4:
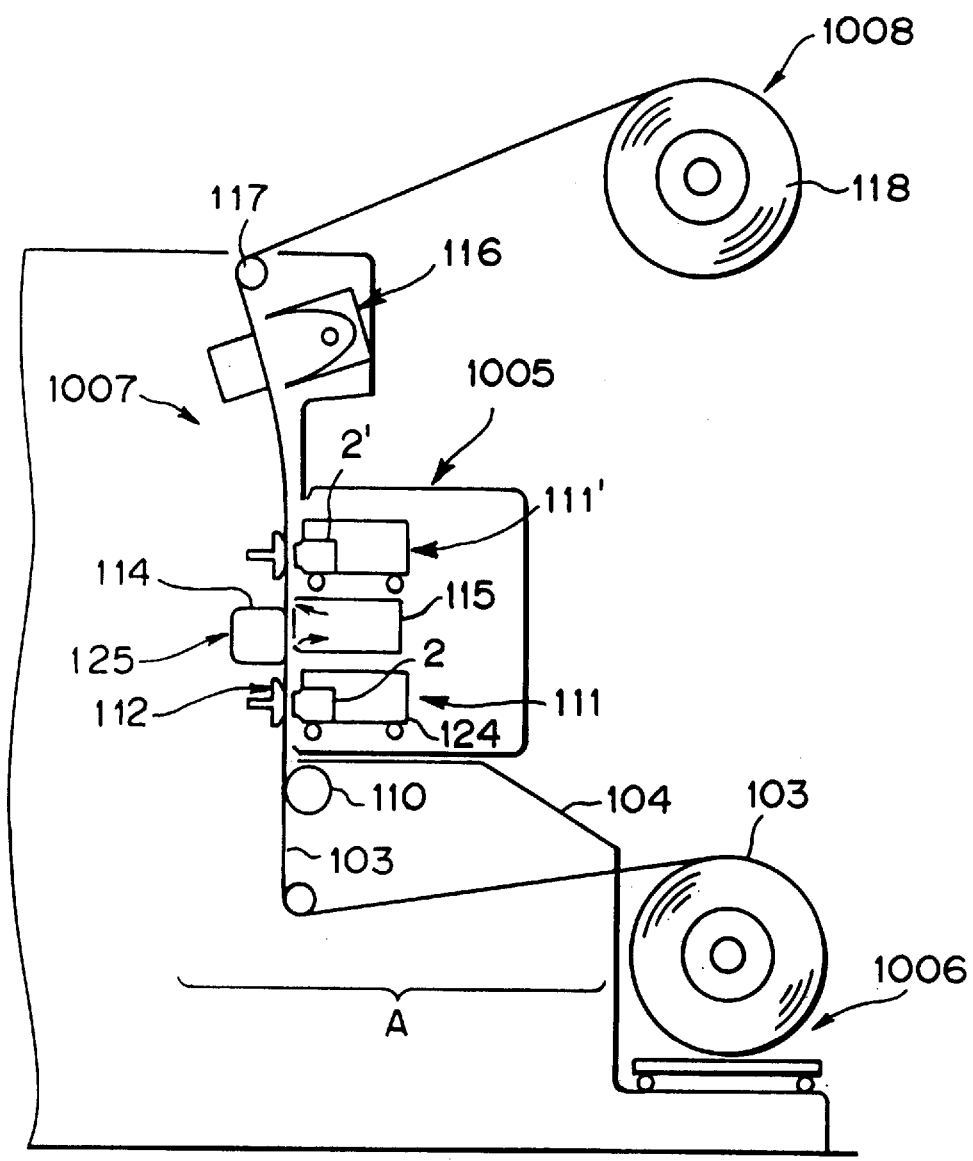
FIG. 4 is a sectional side elevation showing a mechanical construction of the ink-jet printing portion and a cloth feeding portion in the preferred embodiment.
Figure 5:
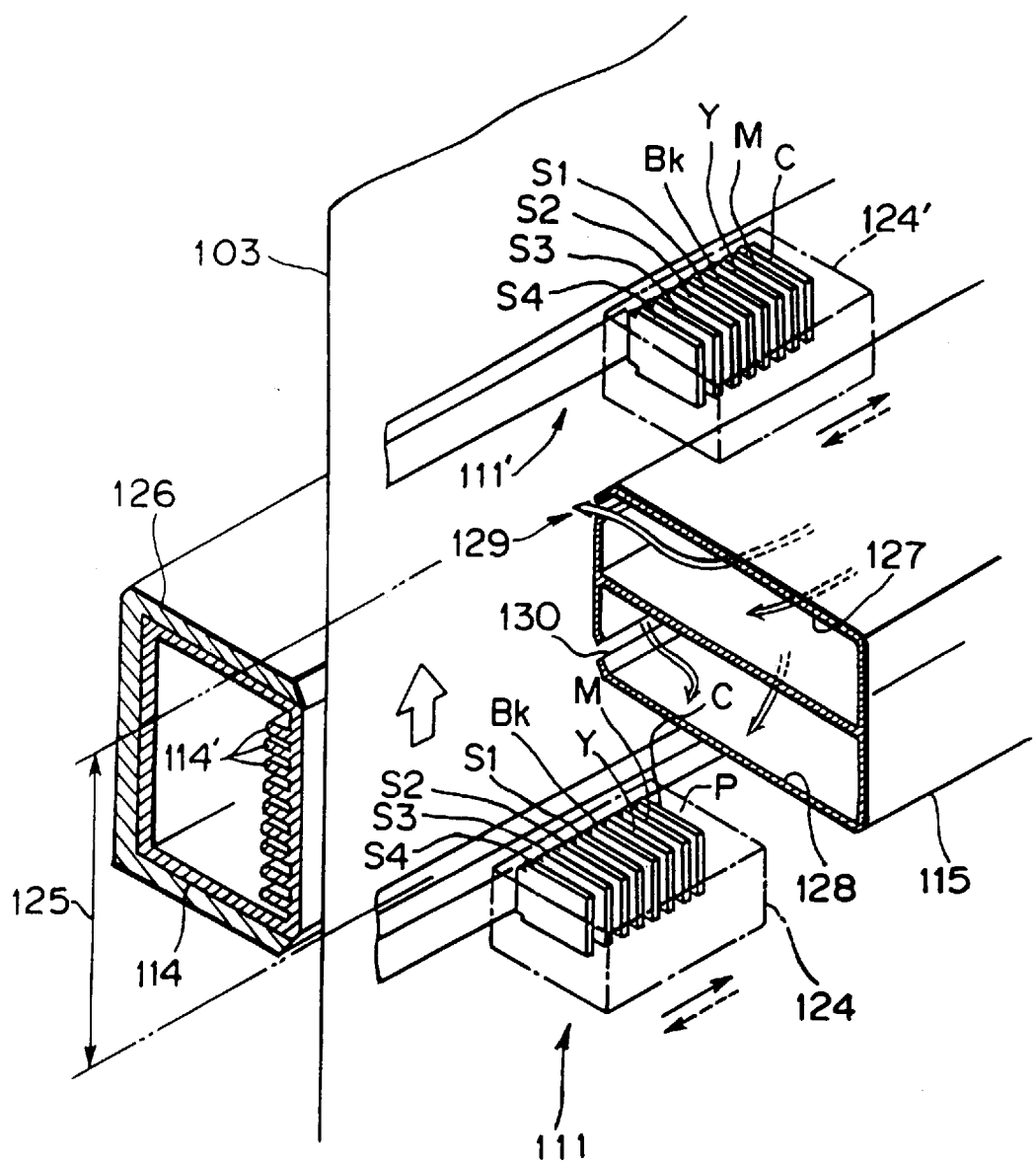
FIG. 5 is a perspective view showing an example of construction around a printing head of the ink-jet printing portion.

FIG. 4 shows an example of an ink-jet printer as the image printing portion in the preferred embodiment of the invention, and FIG. 5 is an enlarged perspective view of a major portion thereof. The shown embodiment of the image printing portion (printer) generally comprises a cloth feeding portion 1006 for feeding a cloth in a roll for which pre-process for textile printing is performed, a main body portion A for performing printing by means of the ink-jet head for the cloth precisely fed per line, a post processing portion 1008 for drying the printed cloth and rolling up the same. The main body portion A includes a print feeder portion 1007 including a platen for performing precise feeding and an ink-jet printing portion 1005.

The pre-processed roll form cloth 103 is fed through the cloth feeding portion 1006 and into the main body portion A in step-feeding. The cloth 103 fed in stepwise manner is restricted to be flat at the printing surface by a platen 112 in a first printing portion 111, and printing is performed on the surface by ejecting ink through the ink-jet head 2. Whenever the one line of printing is completed, step feeding for a given amount is performed. Then, the printed portion is subject for air drying. Subsequently, at a second printing portion 111', overlying printing is performed in the same manner to that in the first printing portion 111.

The cloth 103 thus printed is again dried by a post drying portion 116 constituted of a heater (or hot air) and rolled up on a take-up roll 118 as guided by a guide roll 117. The taken-up cloth 103 is removed from this apparatus and further processed for color development, washed and dried in batch process to be completed as a product.

In FIG. 5, the cloth 103 as the printing medium is fed upwardly in stepwise manner. In the first printing portion 111 at the lower side in the drawing, a first carriage 124 which can mount ink-jet heads for plurality of kinds of inks such as Y, M, C, Bk and special colors S1 to S4, is provided. In the shown case, the ink jet heads for Y, M, C, BK and special color heads S1 to S4, that is, totaling eight ink-jet heads are mounted. The ink-jet head (printing head) 2 of the shown embodiment employs an element for generating a thermal energy for causing film boiling of the ink as energy to be used for ejection of the ink. Also, each printing head employs 256 ejection openings arranged in a density of 400 DPI (dot/inch).

Furthermore, while it is not illustrated in FIG. 5, an ink supply device for supplying necessary amount of ink to the ink-jet head is provided. The ink supply device includes an ink tank and an ink pump and connected to the ink-jet heads 2, 2'via an ink supply tube and so forth so that ink at an amount corresponding to an ejected amount is automatically supplied by capillary effect. On the other hand, upon recovery operation of the ink-jet head, ink is forcedly supplied to the ink-jet head by employing the ink pump. Then, the head and the ink supply device are respectively mounted on separate carriages and driven reciprocally in the direction shown by the arrow in FIG. 5 by a not shown driving device.

Further, though it is not shown in FIG. 5, as set forth above, in order to maintain stability of ink ejection of the head, a head recovery device is provided at a position mating with the head at a home (stand-by) position. The head recovery device performs following operations. Namely, at first, in order to prevent the ink from evaporating through the ejection openings in the head in non-operating or resting condition, the device performs capping for the head (capping operation) at the home position of the head. Also, in advance of starting of image printing, when an ink passage in the head is pressurized by means of the ink pump to be forcedly discharged through the ejection openings so as to remove bubble and/or dust within the ejection openings (pressurizing recovery operation), or when an operation (sucking recovery operation) for forcedly sucking the ink through the ejection openings to discharge the ink for removing bubble and/or dust is performed, the head recovery device collects discharged ink.

(4) Pre-Process

Next, discussion will be given for the pre-processing portion 1010.

Particularly for the cloths adapted to an ink-jet textile printing are required the following properties:
1) the ink may develop a color with a sufficient density;
2) the ink dyeing rate should be high;
3) the ink can be dried quickly on the cloth;
4) occurrence of irregular running of the ink on the cloth can be reduced; and
5) transporting ability in the apparatus is to be good enough.
In order to satisfy the required performance, for the cloths, a pre-process or pre-treatment is performed in the pre-process portion 1010 employing means for impregnating or making to contain a processing agent in the cloths. For example, Japanese Patent Application Laid-open No. 53492/1987 discloses a cloth having an ink receptacle layer. Also, in Japanese Patent Application Publication No. 46589/1991, there is a proposal for the cloth to include a reduction preventing agent or alkaline material in the cloth. As an example of such pre-process, a process for making the cloth to contain a material selected among alkali material, water-soluble high macromolecule, synthetic macromolecule, water soluble metal salt, urea and tiourea can be considered.

In the pre-process, a method for making the cloth contain the above-listed material may be, while not limited, dipping method, pad method, coating method and spraying method and so forth, which are typically performed.

In addition, since a textile printing ink to be applied to the cloth for ink-jet textile printing is merely deposited on the cloth when it is applied to the cloth, it is desirable to subsequently perform fixing step for fixing a coloring agent, such as dye, in the ink to the fiber of the cloth. Such fixing step may be a conventionally known method, such as steaming method, HT steaming method, thermofixing method, and also, when a cloth is not preliminarily performed with an alkali treatment, alkali pad steam method, alkali blotch steam method, alkali shock method, alkali cold fixing method and so forth.

Furthermore, removal of non-reacted dye and removal of the material employed in the pre-process may be performed by washing with water or hot water with dissolving detergent employing a printing medium washing means as in the conventionally known manner, after fixing step. It is further desirable to perform a conventionally known fixing process (process for fixing dye which may be drop out otherwise) during the washing process.

(5) Production Method of Printed Product

Next, a preferred example of a production method of ink-jet printed product will be discussed.

Figure 6:
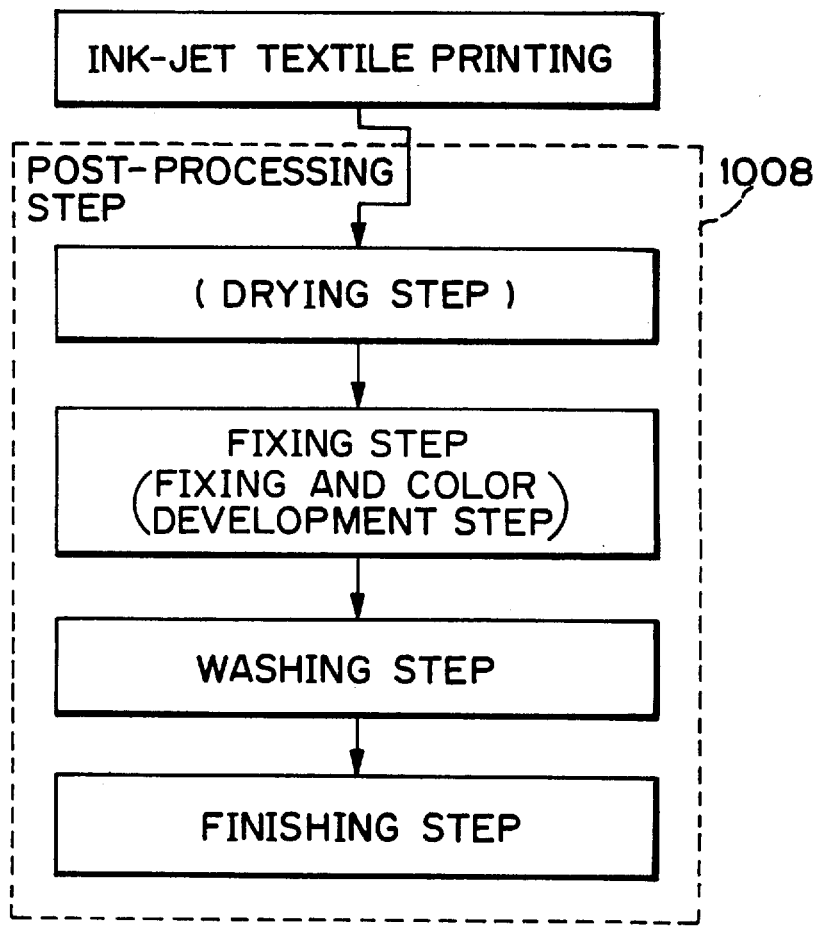
FIG. 6 is a block diagram showing one example of a post process step of textile product.

FIG. 6 is a block diagram for explaining the preferred method. As shown in FIG. 6, after ink-jet textile printing process, the printed cloth is subject to drying (including air drying) process. Then, subsequently, by employing means for fixing a coloring element such as dye, in the ink, a process that the coloring element in the ink is dispersed on the fiber of the cloth and fixed to the fiber, is performed. Through this process, sufficient color development and fastness by fixing of the dye can be attained.

This dispersing and fixing process (dye dispersing process and fixing and color development process are included in this process) can be a conventionally known method. Such conventionally known method may be a steaming method (treatment is performed for 10 minutes under water vapor atmosphere at a temperature of 100° C.). It should be noted that, in this case, in advance of textile printing process, alkali process may be provided for the cloth as pre-process. Also, the fixing process may include or may not include reaction process, such as ion coupling, depending upon the dye. As an example of a later case, the dye may be impregnated in the fiber of the cloth to physically prevent drop out. Also, any appropriate ink containing necessary coloring element may be employed. Therefore, the inks containing not only dye but also pigment may be employed.

Subsequently, in the washing process, removal of the non-reacted dye and removal of the material employed in the pre-process are performed. Finally, finishing process, such as defect correction, iron finishing and so forth are performed for completing printing.

(6) Procedure of Textile Printing

Figure 7:
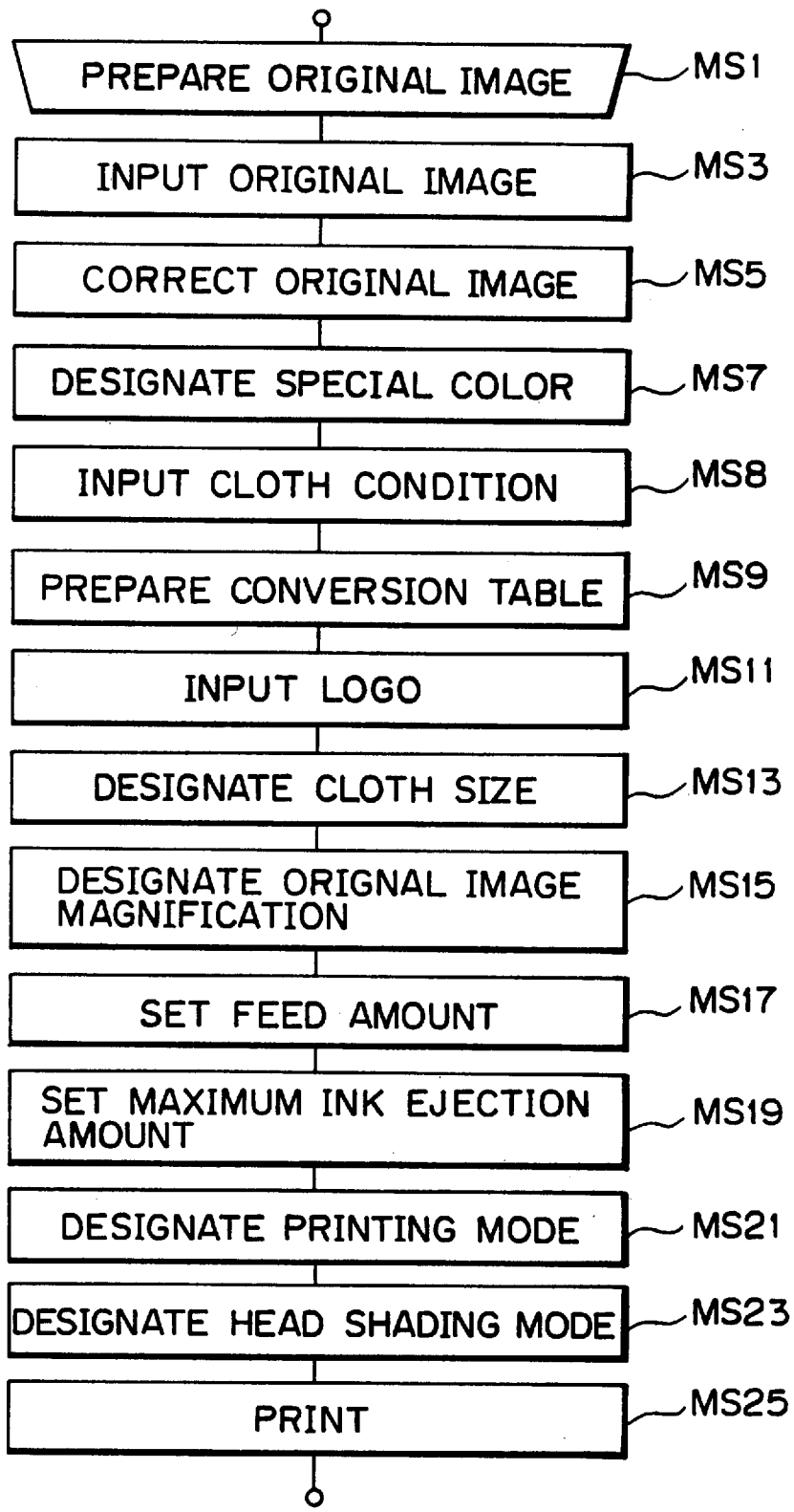
FIG. 7 is a flowchart showing general textile processing procedure of the embodiment of the textile printing system.

Next, discussion will be given for a textile printing process procedure to be performed by the shown system. FIG. 7 is a flowchart showing one example of the textile printing process procedure. The content of respective steps are as follows.

Original Image Input Steps MS1 to MS3

This process is constituted of a step of reading an original image prepared an appropriate means by a designer, namely a basic image to be a basic unit of a repeated image on the cloth as the printing medium, is read by a reader portion 1001, a step of reading an original image data stored in an external storage device (hard disk drive and so forth), or a step for receiving an original image data through LAN or so forth.

Original Image Correcting Step MS5

In the shown embodiment of the textile printing system, various repetition patterns can be selected with respect to the basic image. However, in certain repetition patterns, it is possible to cause undesirable positioning error of the image and discontinuous tone at the boundary. In the shown step, the selection of the repetition pattern is given and the discontinuity of the repetition pattern at the boundary is corrected depending upon selection. As a manner of correction, designer or operator may perform correction utilizing a mouse or other input means with making reference to an image of display (not shown) connected to the control portion 1009, or the image processing portion 1002 may perform automatic correction.

Special Color Designation Step MS7

The image printing portion 1004 in the shown embodiment performs printing basically employing inks of yellow (Y), magenta (M) and cyan (C), and further black (BK). In textile printing, colors other than these colors, such as metallic color, e.g. gold color, silver color and so forth, clear red (R), green (G), blue (B) can be desired. Thus, in the printer P of the shown embodiment, printing employing inks of these special colors is enabled. In this step, designation of the special colors is performed.

Cloth Condition Input Step MS8

In this step, information relating to printing of the cloth to be used is input. Since color development characteristics and dye to be used are differentiated depending upon the fiber and fiber mixing ratio of the cloth, information of the fiber constituting the cloth, fiber mixing ratio, fabrication pattern and so forth is input for enabling appropriate printing.

Image Signal Conversion Step MS9

In this step, data for determining mixing ratio in the printing performed by employing C, M, Y, Bk and/or special colors is generated to precisely reproduce tone of the original image prepared by the designer.

Logo Input Step MS11

It is frequent to print logo mark, such as designer brand, maker brand and so forth at an end of cloth, in the case of fabric. In this step, designation of such logo mark and designation of color, size and position and so forth are performed.

Cloth Size Designation Step MS13

Width and length and so forth of the cloth as printing object is designated. By this, scanning amount of the printing head in the printer P in the primary scanning direction and auxiliary direction and number of repetition of the original pattern can be determined.

Original Image Magnification Designation Step MS15

The magnification (e.g. 100%, 200%, 400% and so forth) upon printing with respect to original image is set.

Feeding Amount Setting Step MS17

As the cloth, there are variety of kinds of cloths of natural fiber, such as cotton, silk, wool and so forth and synthetic fiber, such as nylon, polyester, acryl and so forth. These wide variety of cloths have different characteristics associated with textile printing, characteristics as cloth and various other characteristics. Then, due to expendability of the cloth, when the feeding amount upon printing is made equal, a pattern of line appearing at the boundary primary scanning line is differentiated. Then, in this step, with respect to the cloth for printing, a value of feeding amount is set so that the feeding amount in the image printing portion 1004 becomes appropriate.

Ink Maximum Ejection Amount Setting Step MS19

Even when the same amount of ink is ejected, the image density to be reproduced on the cloth is inherently differentiated depending upon the kind of cloth. Also, by the construction of a fixing system in the image printing portion 1004, the ink amount which can be ejected, is differentiated. In this step, the maximum ejection amount of the ink depending upon the kind of the cloth and the construction of the fixing system of the image printing portion 1004 are designated.

Printing Mode Designation Step MS21

Here, designation is made whether high speed printing or normal printing is performed in the image printing portion 1004, or whether each dot is formed by single ink ejection or a plurality of times of ink ejection, and so forth is performed. Furthermore, when printing is interrupted, it is possible to designate whether a control to maintain continuity of the printed pattern before and after interruption is to be performed or to start new printing irrespective of continuity of the pattern.

Head Shading Mode Designating Step MS23

When the printing head having a plurality of ejection openings are employed in the image printing portion 1004, it is possible to cause fluctuation of the ink ejection amount and the ejecting direction per ejection opening of the head due to tolerance in production and subsequent use condition. A process (head shading) may be performed for making the ejection amount constant by correcting driving signal per each ejecting opening to be corrected for correcting fluctuation of ejection characteristics. In this step, designation of timing and so forth of the head shading is enabled.

Printing Step MS25

On the basis of designations as set forth above, the textile printing is performed by the image printing portion 1004.

It should be noted that when designation at one or more pre-processes are unnecessary to perform, such step or steps are neglected or skipped. Also, as required, a step for permitting other designations may be added.

(7) Image Printing Portion

An example of a sequence of image processing procedure will be discussed.

Figure 8:
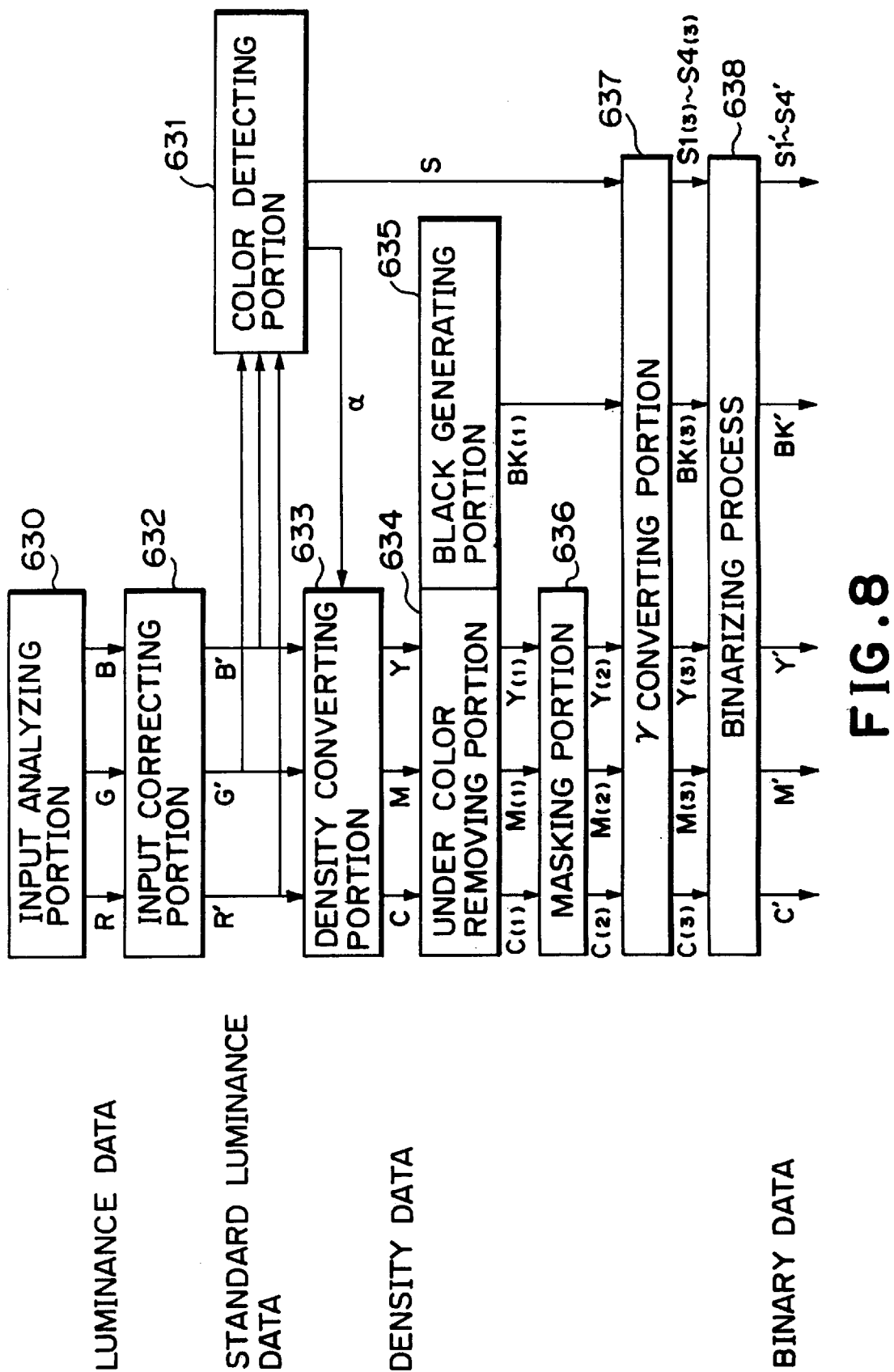
FIG. 8 is a flowchart showing a part of a general processing procedure of the image processing portion of the shown embodiment.

FIG. 8 illustrates an example of an image processing portion which performs converting R, G, B signals obtained from the original image input at step MS1 into C, M, Y, Bk, signals and a generation of special color signals S1 to S4.

In addition, the control portion 1009 makes the image processing portion 1002 to perform following procedure regarding the original image data (luminance data) supplied at step MS1 for R, G and B. In FIG. 8, an input correcting portion 632 performs conversion into a standard luminance data R', G' and B' (e.g. R, G, B of NTSC system for a color television) considering a light separating characteristic, a dynamic range and so forth. Simultaneously, a density converting portion 633 performs conversion into the density data C, M and Y employing a non-linear conversion, such as logarithm conversion from the standard luminance data R', G' and B'. An under color removing portion 634 and a black generating portion 635 performs under color removing and a generation of black color on a basis of the density data C, M and Y, an UCR amount β and black amount σ. The following is an example of calculation for under color removing and the generation of black color.

C(1)=C−β×MIN(C, M, Y)
M(1)=M−β×MIN(C, M, Y)
Y(1)=Y−β×MIN(C, M, Y)
K(1)=σ×MIN(C, M, Y)

Next, a masking portion 636 performs correction of the density data C(1), M(1), Y(1) to which are applied an under color removing procedure in consideration of an unnecessary wave length light absorption characteristic of ink. An example of calculation for the correction is as follows.

C(2)=A11×C(1)+A12×M(1)+A13×Y(1)
M(2)=A21×C(1)+A22×M(1)+A23×Y(1)
Y(2)=A31×C(1)+A32×M(1)+A33×Y(1)

Aij(i,j=1–3) represents a masking coefficient.

Here, the unnecessary wave length light absorption characteristic of ink is differentiated depending upon the kind of fibers to be used. Therefore, the masking coefficient adapted to respective kinds of fibers is stored in a storage memory (not shown).

Next, a γ converting portion 637 converts the data C(2), M(2), Y(2) and BK(1) into data C(3), M(3), Y(3) and K(3) of which γ output is adjusted. More specifically, γ correction is performed to make a relation of the image density printed by the inks with respective signals of C(3), M(3), Y(3), BK(3) to be varied linearly.

Here, the printing head to be employed in the shown embodiment is a printing means which has only two states, i.e. ejecting of the ink and not ejecting of the ink. Therefore, a binarization processing portion 638 performs binarizing processing so that binarized data C', M', Y', BK' which represent pseudo tone expression of C(3), M(3), Y(3), K(3) as multi-value data, is obtained.

Furthermore, in the shown embodiment, a color detecting portion 631 which is provided for generating a designation for printing with replacing a given range of R, G, B on chromaticity chart (R', G', B' provided by the input correcting portion 632) with the special colors S1 to S4 depending upon designation of the special color provided at step MS7. This designation is supplied to the γ converting portion 637 as a signal S. The γ converting portion 637 outputs appropriate special color signals S1(1) to S4(3). Then, the special color signals are binarized by the binarization processing portion 638 to generate signals S1' to S4'.

It should be noted that when mixing of the special color and C, Y, M and so forth is desired, data determining a mixing ratio between α=0 designating only use of special color and α=1 designating only use of C, M, Y.

"The mixing ratio", in the shown embodiment, means a ratio at which a plurality of kinds of inks are ejected in a mixing manner. Data of the mixing ratio is obtained in such manner that a set of data C, M, Y which are to be replaced by the special color is previously determined, and a ratio of a difference between data C, M, Y in the case of α=1 and the above-stated set of data to data of the special color.

On the other hand, as set forth above, in textile printing, color development characteristics of the dye is differentiated depending upon the cloth to be printed. Therefore, in the case that the cloth to be used is the kind which is not yet registered, it becomes necessary to adjust and set the image processing parameter. However, since there are a quite large number of kinds of cloths, and furthermore, in case of the mixed fiber cloth consisted of a plurality of kind of fibers, huge variety are present in kinds of the fibers to be mixed, fiber mixing ratio, fabrication pattern and so forth to cause difference of quite wide variety of color development characteristics depending upon these conditions, it is inherent to require huge amount of time for adjustment of the parameters and quite large capacity of a memory for storing setting data.

Therefore, in the shown embodiment, when the cloth consisted of different kinds of fibers having mutually different color development characteristics while dyeing can be done with the same dye is used as the printing medium, an appropriate parameter can be easily obtained without adjusting and registering new image processing parameter.

More specifically, as appropriate image processing parameters with respect to several kinds of cloths respectively consisted of single kind fibers are preliminarily registered as masking coefficients. Then, when printing is performed for the cloth consisted of a plurality of kinds of fibers, respective masking coefficients of the fibers consisting the cloth to be used for printing are selected among the registered coefficients. Then, the selected masking coefficients are converted, combined depending upon the fiber mixing condition to obtain an appropriate masking coefficient for the cloth to be used for printing. Then, by using the masking coefficient thus obtained, conversion of the image signal is performed to adapt the tone of the textile printed product.

Hereafter, concrete discussion will be given for the case that the ink with reaction type dye applicable for both of cotton and silk is used for printing on mixed fiber cloth of plain weave with fiber mixing ratio of cotton and silk of 1:1, as printing medium.

Figure 9:
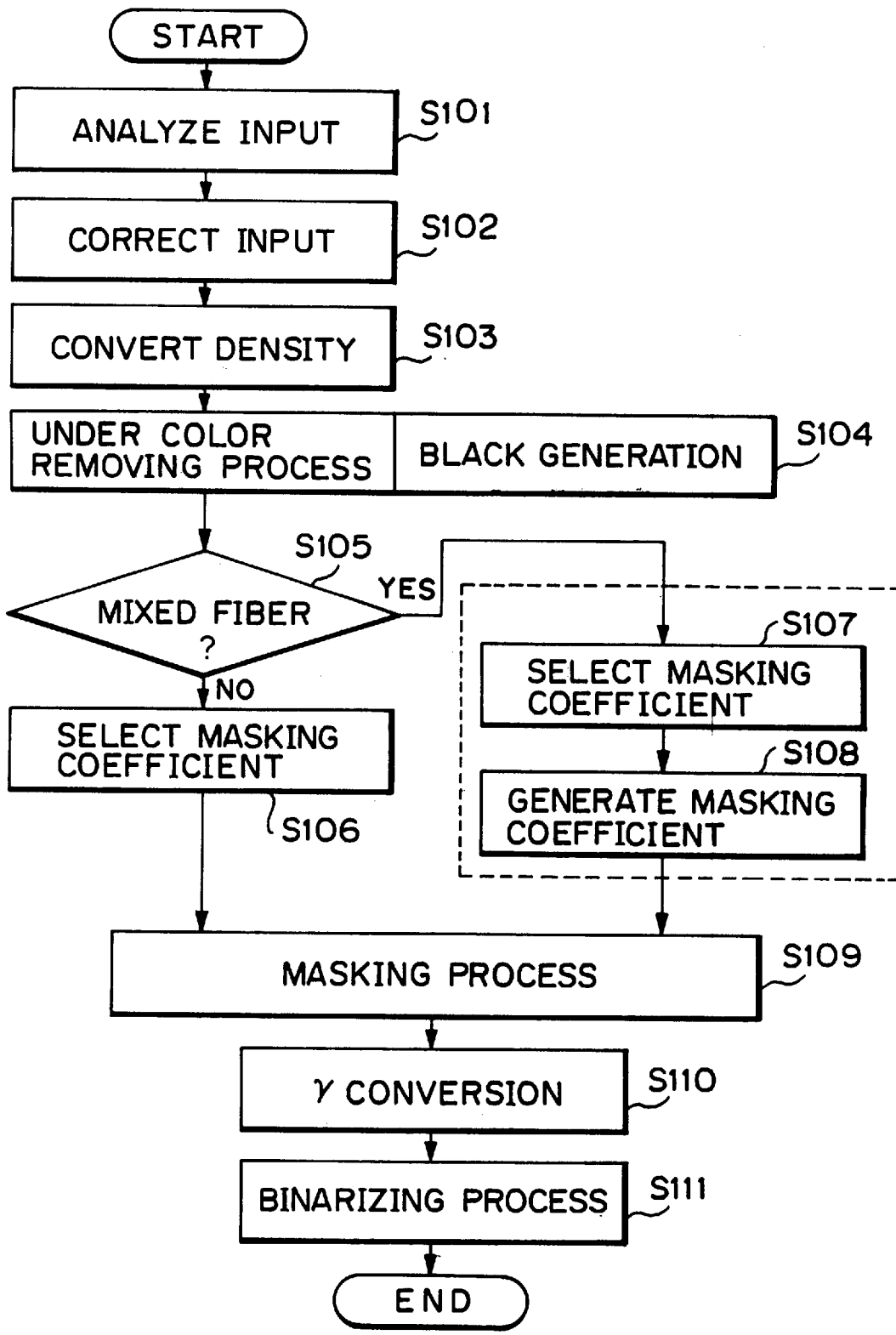
FIG. 9 is a flowchart showing a calibration of a selective conversion of an image processing parameter in the case where a cloth constituted of a plurality of kinds of fibers having different color development characteristics which can be colored by the same dye is used as a printing medium.
Figure 10:
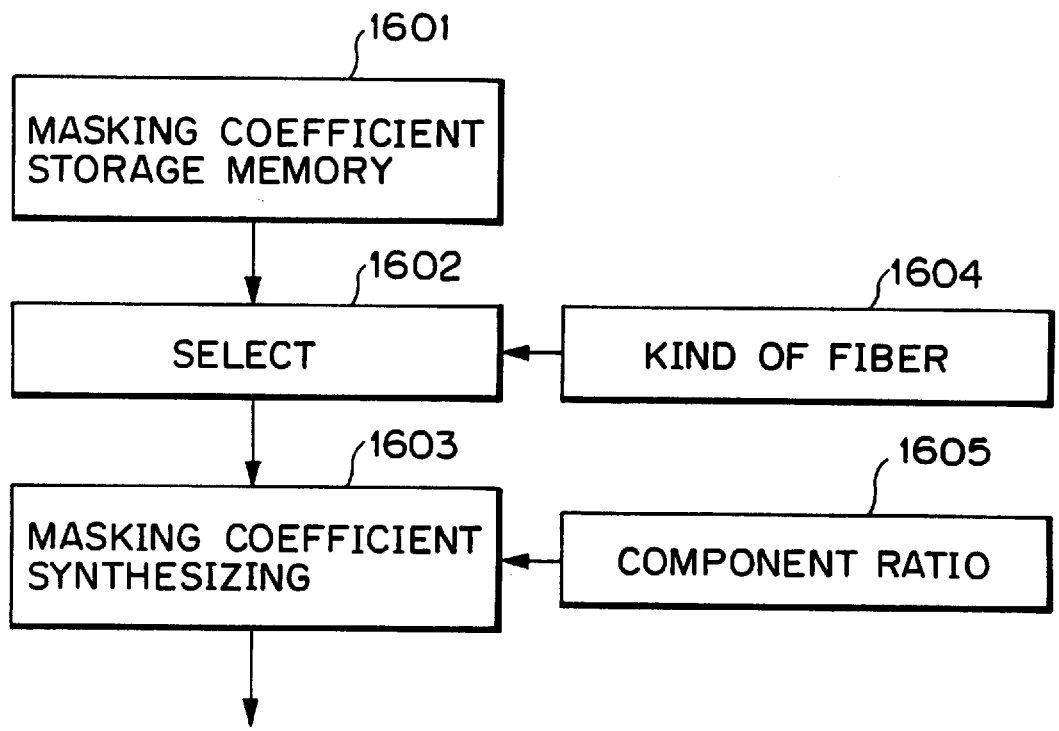
FIG. 10 is a block diagram showing a detail of a part of the functional construction of the foregoing procedure shown in FIG. 9.

FIG. 9 is a flowchart showing a process to be performed by the image processing portion shown in FIG. 8, and FIG. 10 is a block diagram showing a functional construction of the image processing portion upon printing on the mixed fiber cloth.

In FIG. 9, at steps S101 to S104, processes of density conversion and under color removal and so forth as discussed with respect to FIG. 8 are performed. Next, at step S105, check is performed whether the cloth to be used is the mixed fiber cloth or not on the basis of the result of the kind of fiber input at step MS8 in FIG. 7. Here, if judgement is made that the cloth to be used is not mixed fiber cloth, the preliminarily registered masking coefficient adapted to the component fiber of the cloth is selected from the masking coefficient storage memory to perform masking process at step S106.

On the other hand, when judgement is made that the cloth to be used is the mixed fiber cloth as checked at step S105, the masking coefficient depending upon the kinds of fibers (1604: see FIG. 10) is selected from the masking coefficients in the masking coefficient memory 1601, at step S107 (1602). Next, the selected masking coefficients are synthesized (1603) depending upon a component ratio (1605) of the cloth. It should be noted that while the masking coefficient is synthesized in accordance with the component ratio of fibers composing the cloth in the shown embodiment, the masking coefficient may be synthesized in accordance with visual sensing characteristics.

In concrete, when judgement is made that the cloth to be used is a mixed fiber of cotton and silk at step S105, respectively appropriate masking coefficients Mc and Ms for cotton and silk are selected, respectively. Next, in the case that a surface coverage ratio of each fiber on the printing surface as the component ratio is used, when the ratio is 1:1 for example, the masking coefficient M1 of the mixed fiber cloth in the shown embodiment can be derived from the following equation. It should be noted that, as in the shown embodiment, in case of plain weave having equal surface coverage of the warp and woof are equal to each other, a fiber mixing ratio may be used as the surface coverage of the cotton and silk as is.

M1=½ (Mc+Ms)

As set forth above, when the cloth consisted of different kinds of fibers having mutually different color development characteristics while dyeing can be done with the same dye is used as the printing medium, it becomes possible to perform adaption of tone of the textile printing product by printing with appropriate image signal on the cloth, constantly, by selecting the image processing parameter adapted to the kind of fiber of the cloth to be used, converting the image processing parameter depending upon the fiber mixing condition, and performing conversion by synthesizing the image signal. In this case, a total amount of inks to be ejected from respective ink-jet heads ejecting respective color inks to a common region of the printing medium, is differentiated depending upon the mixing ratio of the fiber.

It should be noted that when the mixing ratio is $\alpha_1:\alpha_2$, in general, it should be clear that the synthesized masking coefficient M is expressed by $M=(\alpha_1 M_1+\alpha_2 M_2)/(\alpha_1+\alpha_2)$. Also, it is the matter of course that the fibers consisting the cloth are not limited to two kinds.

Second Embodiment

In the shown embodiment, discussion will be given for the case where a cloth consisted of a plurality of kinds of fibers which are to be dyed by mutually different dyes in the respective inks.

Here, with respect to each fiber consisting the cloth to be used for printing, each image processing parameter is selected among preliminarily registered image processing parameters. With respect to these, conversion is performed depending upon the characteristics of other fibers consisting the cloth and fiber mixing condition. Thus, conversion for the image signal is performed with an appropriate image processing parameter for the cloth to be printed to match the tone of the textile printed product.

Hereinafter, discussion will be given for the case where printing is performed with employing reaction type dye and dispersion type dye applicable for respective fibers of cotton and polyester the inks for printing on a mixed fiber cloth having a fiber mixing ratio of cotton versus polyester of 1:3 and being woven in twill.

Figure 11A:
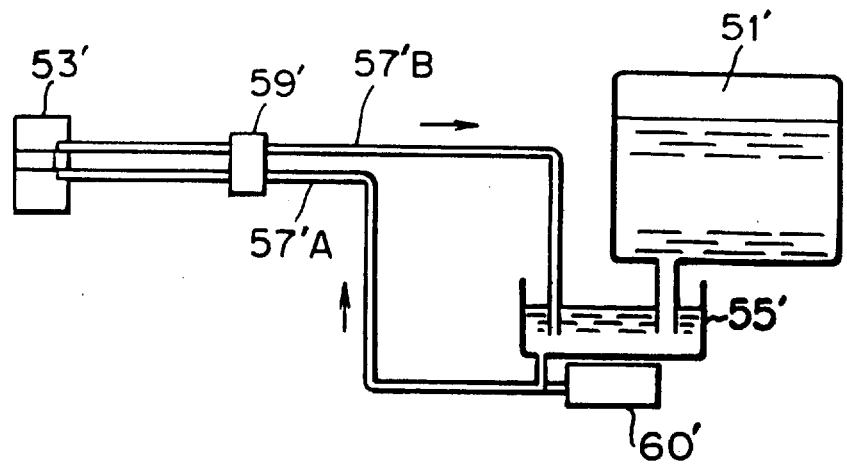
FIGS. 11A and 11B are diagrammatic illustrations for explaining inking system of the embodiment.
Figure 11B:
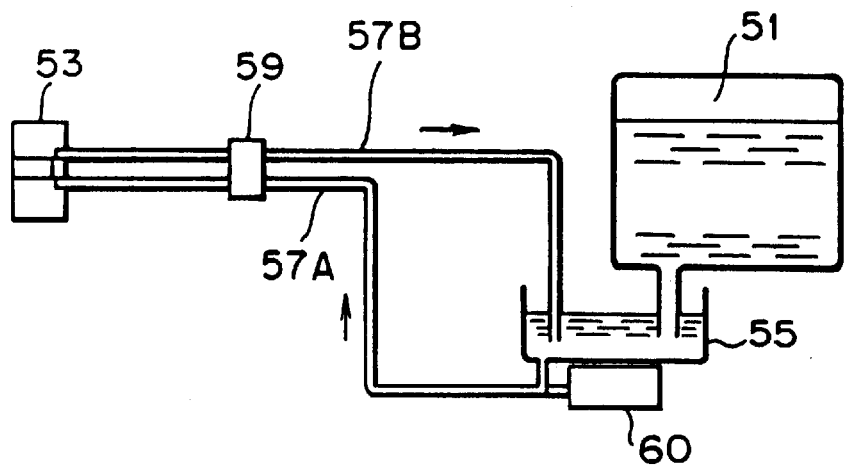

FIGS. 11A and 11B are diagrammatic illustrations showing example of construction of an ink supply system in the shown embodiment of the apparatus in the case where the inks of different dyes are employed. Here, reference numerals 51 and 51' are ink bottles forming ink supply sources for a lower head 53 and an upper head 53', respectively. Reference numerals 55 and 55' are sub-tanks as intermediate storage members for the ink arranged in respective ink supply paths between the ink bottle 51 and the lower head 53, and between the ink bottle 51' and the upper head 53', which ink sub-tanks 55, 55' are designed for temporarily storing the inks supplied from the ink bottles 51 and 51'. In conjunction therewith, the sub-tanks 55, 55' also stores the ink recirculated from the side of the heads 53 and 53'. Liquid levels in the sub-tanks 55, 55' are maintained constant by providing appropriate level sensors, valves in the ink supply paths and driving means thereof, or by making the inside of the sub-tank to be sealed system. Therefore, the ink supply pressure to the heads 53 and 53' can be held constant.

Reference numerals 57A and 57'A are ink tubes forming respective ink supply paths directed from the sub-tank 55 to the lower head 53 and from the subtank 55' to the upper head 53', which tubes are connected to ink connectors 59 and 59' provided in carriages 24 and 24', respectively, for example, and are formed of flexible material to follow the scanning motions of the carriages 24 and 24'. Reference numerals 57B and 57B' are ink tubes which comprise ink recirculating paths and which are constructed similarly to the tubes 57A and 57A'. Reference numerals 60 and 60' are pressurizing motors pressurizing the ink supply system via the tubes 57 and 57'A to forcedly discharge the ink through the ink ejection opening of the heads 53 and 53' during an ejection recovery operation.

As shown in FIGS. 11A and 11B, in the shown embodiment, mutually independent ink supply systems are arranged in vertical direction, so that two ink supply systems are arranged corresponding to respective heads. In the shown embodiment, with respect to the same colors, the ink with the reaction type dye and the ink with the dispersion type dye are provided and these two kinds of inks are set in two series of the ink supply systems.

Figure 12:
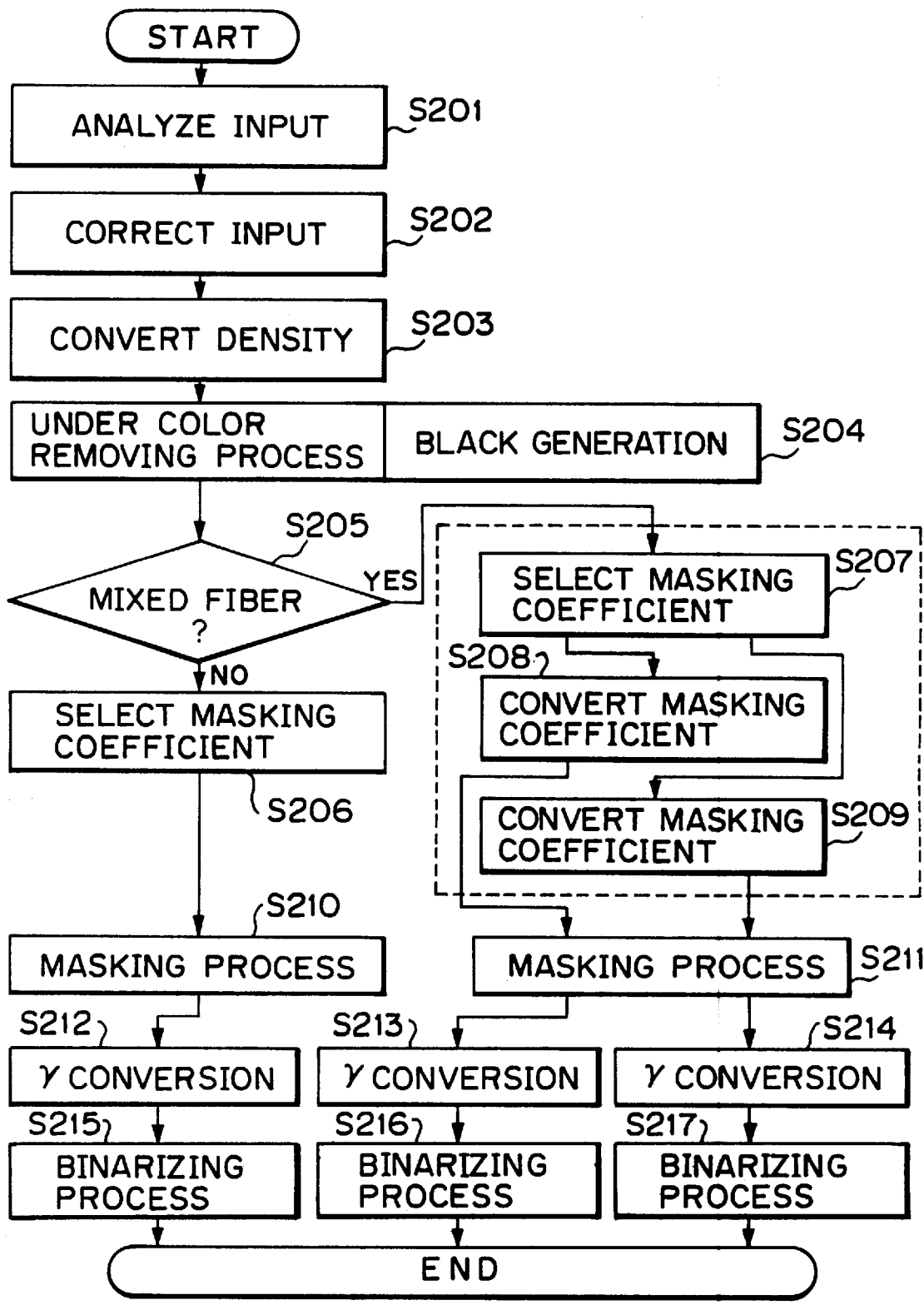
FIG. 12 is a flowchart showing a calibration procedure of a selective conversion of a masking coefficient as an image processing parameter in the case where a cloth constituted of a plurality of kinds of fibers having different color development characteristics which can be colored by the different dyes.
Figure 13:
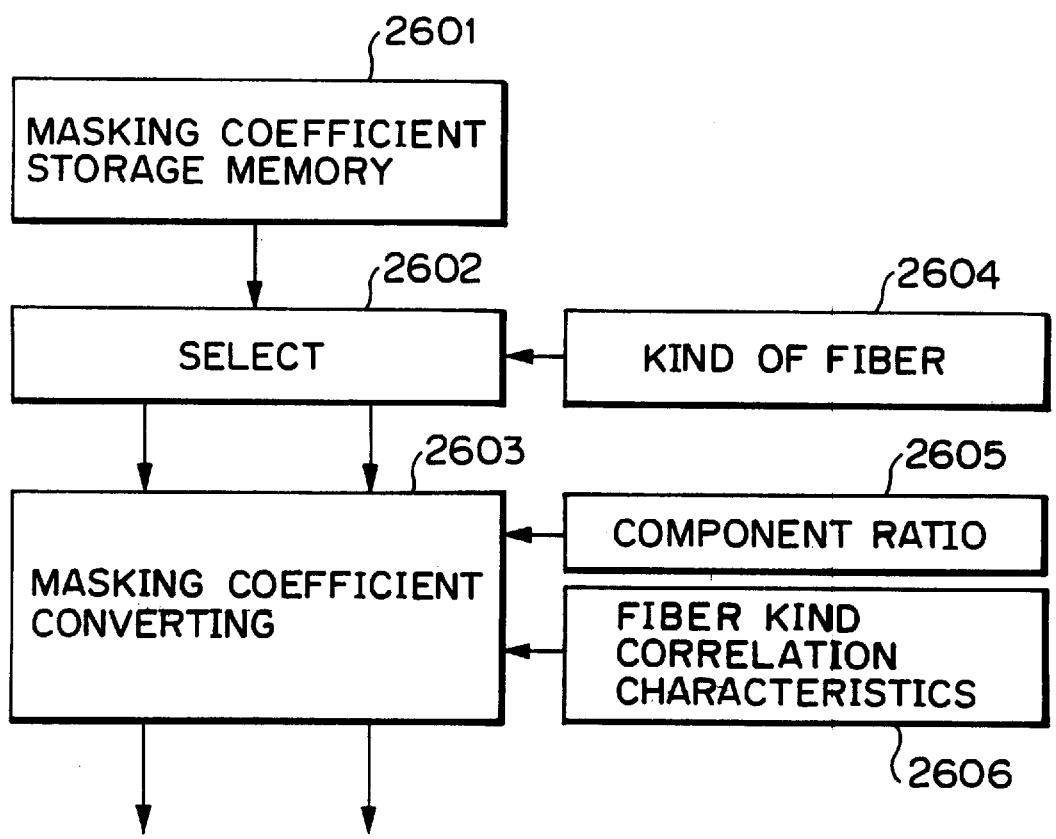
FIG. 13 is a block diagram showing a detail of a part of functional construction of the foregoing procedure shown in FIG. 13.

FIG. 12 is a flowchart of the image processing in the shown embodiment, and FIG. 13 is a block diagram showing the functional construction of the image processing portion when the cloth used is mixed fiber cloth. As can be clear from the flow of the process shown in FIG. 12, in the shown embodiment, when printing is performed to the mixed fiber cloth, in order to make it possible to perform two series of processing in the respective steps, two series of image processing portions are provided.

At step S205 in FIG. 12, check is performed whether the cloth to be used is the mixed fiber cloth or not on a basis of the cloth kind input. When judgement is made that the cloth to be used is not the mixed fiber cloth, the similar processes to the foregoing first embodiment are performed at steps S206 and S210.

On the other hand, when judgement is made that the cloth to be used is the mixed fiber cloth at step S205, the masking coefficients depending upon the kinds of fibers (2604: see FIG. 13) are selected from the masking coefficient memory 2601 (2602). Next, with respect to each masking coefficient, respective conversion thereof is performed with a coefficient α associated with the component ratio (2605) of respective fibers to be mixed, and a function β associated with respect to characteristic (2606) of the other fiber to be mixed, respectively. The conversion process can be expressed by following equation (1):

$$M'=\alpha\times\beta\times M$$

wherein M' is the masking coefficient after conversion.

Then, at step S211, to a data processed through density conversion, under color removal and black generation, the masking process with the converted masking coefficients are applied.

In concrete, at first, the appropriate masking coefficients Mc and Mp respectively adapted to the cotton and polyester, are selected. Next, as coefficients $\alpha_c$ and αp regarding the component ratio, a surface coverage ratio of respective fibers at a printing surface are employed. In addition, due to a dyeing characteristics of the polyester, cyan type becomes lacking to cause poor tone. Therefore, as the function βp with respect to other fiber in the cotton, a function to provide higher tone for the cyan type is employed. As the function βp associated with other fiber in the polyester, since the tone of the cotton has no significant dyeing characteristics, a function not affecting the tone is employed. Thus, the masking process is performed with employing Mc' and Mp' which are derived by conversion with $\alpha_c$, $\alpha p$, $\beta C$, and $\beta p$. Subsequently, to each density data obtained by masking process with respect to respective fibers, namely, with respect to respective color inks, there is performed image processing similar to that of the first embodiment (steps S213, S216 and S214, S217), and ejections of the inks adapted to the respective characteristics are performed on a basis of the ejection signal obtained as a result through the process set forth above.

Following equation (2) shows the coefficients, the functions and the converting equations in the shown embodiment.

In the shown embodiment, the cloth in which the surface coverage ratio at the warp and woof is 1:3 and which is twill is employed. Here, in case of mixed fiber, since the fiber is mired from the timing where the yarn is to be added, as the surface coverage ratio between the cotton and polyester, fiber mixing ratio can be used as is.

$$\alpha c = \alpha p = 1/2 \tag{2}$$

$$\beta c = \begin{bmatrix} 1.2 & 1 & 1 \\ 1 & 1 & 1 \\ 1 & 1 & 1 \end{bmatrix}$$

$$\beta p = \begin{bmatrix} 1 & 1 & 1 \\ 1 & 1 & 1 \\ 1 & 1 & 1 \end{bmatrix}$$

$$Mc' = \alpha c \times \beta c \times Mc$$

$$Mp' = \alpha p \times \beta p \times Mp$$

On the other hand, as the component ratio, may be employed a surface exposing area other than the fiber mixing ratio.

When the woven cloth in twill with a cotton thread with 200 $\mu$m in diameter as warp and a nylon thread with 100 $\mu$m in diameter as woof is employed as the printing medium, and when reaction type dye and acid type dye which are applicable for the cotton and nylon, are used in the inks, the exposing ratio of the cotton and the nylon to the printing calculated on a basis of diameters of the threads and surface coverage ratio on the surface of respective threads is employed as the coefficients $\alpha c$ and $\alpha n$ with respect to the component ratio. In addition, since light-resistance of cyan is slightly lowered in comparison with that of the cotton in view of dying characteristics of nylon, as the function $\beta c$ associated with other fiber in the cotton, a function by which cyan becomes stronger is employed. On the other hand, as the function $\beta n$ associated with the other function in the nylon can be a function which is weaken corresponding to strengthen in $\beta c$. The following equations (3) show one example of the values of $\alpha$ and $\beta$.

Ratio of Diameter of Threads
  cotton:nylon=2:1
Ratio of Surface Coverage
  cotton:nylon=1:3
from the above, $$\alpha c = 2/5 \tag{3}$$

$$\beta n = 3/5$$

-continued $$\beta c = \begin{bmatrix} 1.2 & 0.9 & 1 \\ 1 & 1 & 1 \\ 1 & 1 & 1 \end{bmatrix}$$

$$\beta n = \begin{bmatrix} 0.9 & 1.1 & 1 \\ 1 & 1 & 1 \\ 1 & 1 & 1 \end{bmatrix}$$

As set forth above, even when the cloth consisted of a plurality of kinds of fibers to be dyed with inks containing different dyes, is used, it becomes possible to perform conversion of the image signal with an appropriate image processing parameter adapted to the cloth to perform printing by selecting image processing parameters for respective fibers of the cloth to be printed and converting respective image processing parameters depending upon the characteristics of the kinds of other fibers and the fiber mixing ratio and so forth. Therefore, printing can be performed with appropriate image signal adapted to the cloth to be used. Thus, it becomes possible to expect the tone of the textile printing product to perform color matching. In this case, a total amount of inks which have same color tone and are ejected to a same region of the printing medium from the respective heads, is differentiated in accordance with the component ratio of the fibers.

Furthermore, it should be noted that while the shown embodiment has been concentrated for the textile printing on the cloth of mixed fiber with two kinds of fibers and mixed weave, it is naturally possible to use three or more fibers. In addition, while the shown embodiment has not mentioned with respect to order of ink ejection in case that dyeing is to be performed with inks containing different kinds of dyes, the order of ejection may be any arbitrary order as long as no problem in color development can be avoided.

However, in general, when 1) the ink employing a reaction type dye, 2) the ink employing acid type dye, direct type dye or 3) the ink employing the dispersing dye are employed, the preferred order is 1), 2) and 3) in order.

The above-mentioned inks 1) to 3) are differentiated in mechanism of dyeing and fixing. Namely, the dispersing dye forming the ink 3) is dispersed in the specific fiber to physically coupled with the fiber for dyeing and fixing. Therefore, it may not be influenced by the inks deposited in advance. Therefore, even when the inks of 1) and 2) are ejected in advance, no problem will arise.

On the other hand, the inks 1) and 2) are fixed on the specific fiber. Therefore, it may be possible to be influenced by the ink ejected in advance. Therefore, it is desirable to eject the inks of 1) and 2) at earlier timing.

Furthermore, the order of ejection will not be considered to cause a significant problem for performing printing with inks of 1) and 2). However, it is desirable to perform printing with the ink of 1) which dyes by common coupling at first order to enhance uniformity of dye fitting and dyeing and fixing, and color development.

Figure 14:
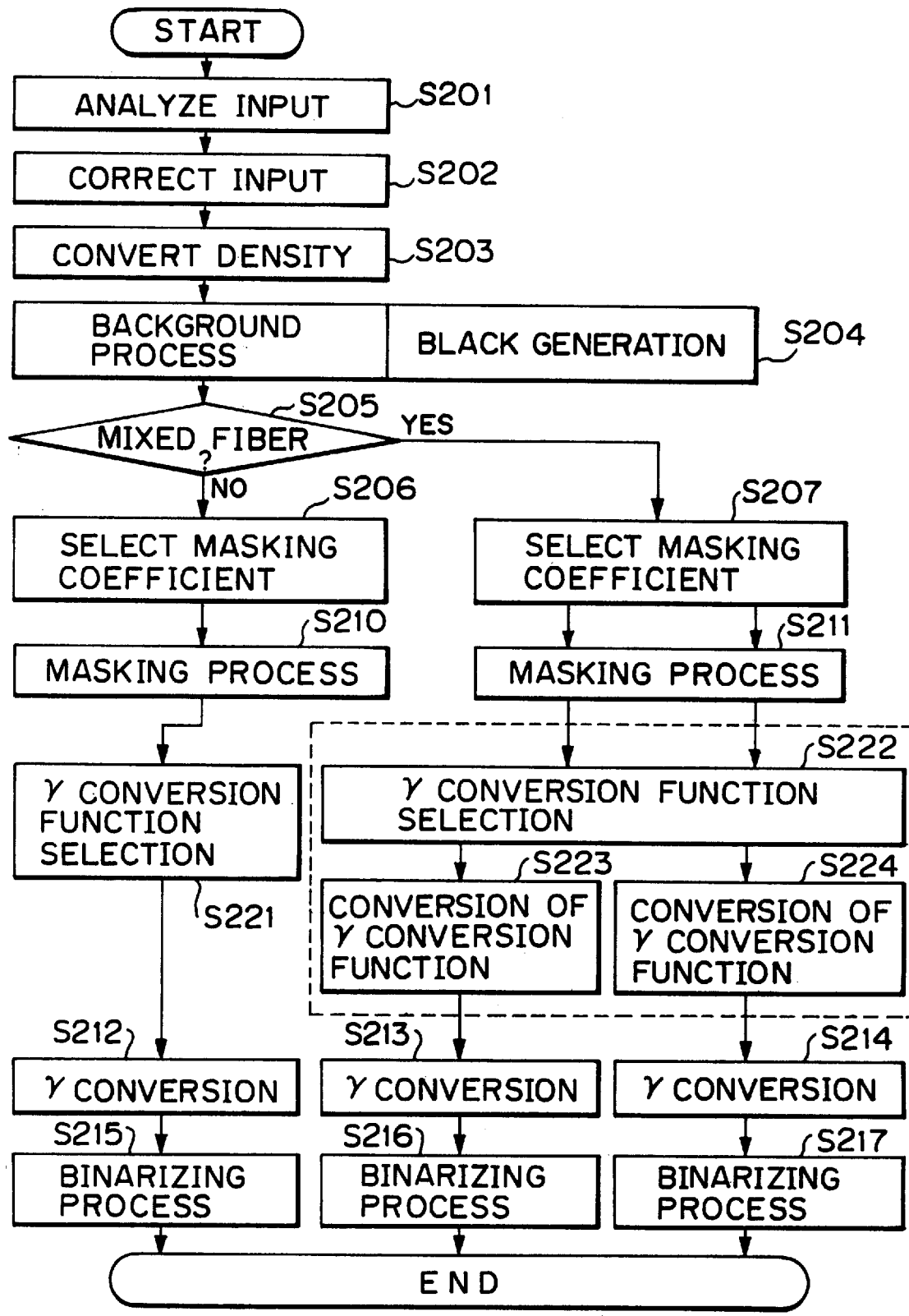
FIG. 14 is a flowchart showing a calibration procedure of a selective conversion of a γ transformation function as the image processing parameter.
Figure 15:
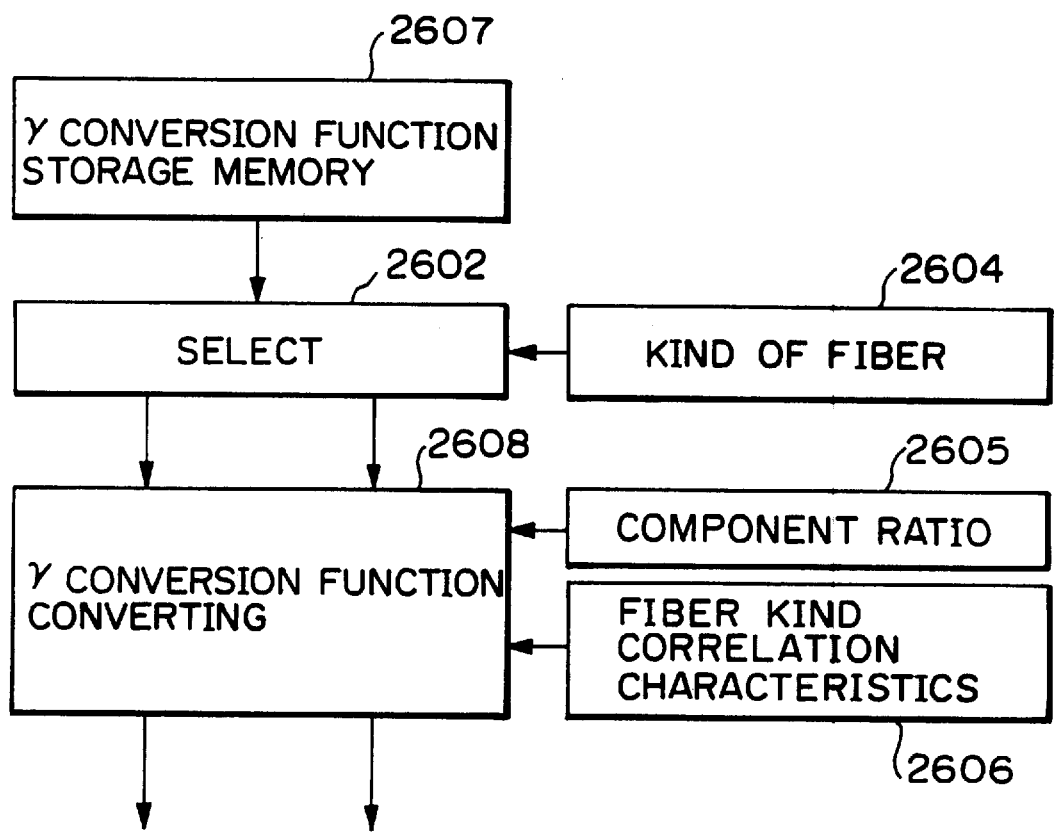
FIG. 15 is a block diagram showing a detail of a part of functional construction of the foregoing procedure shown in FIG. 14.

It should be noted that while the masking coefficient is employed as the image processing parameter in the above-described embodiments, a function with respect to the $\gamma$ conversion may be employed as the image processing parameter to obtain a similar effect to that of the above described embodiments. FIG. 14 is a flowchart showing an image processing in which a $\gamma$ conversion function is employed as the image processing parameter in the case that the cloth consisting of cotton and nylon is used, and FIG. 15 is a block diagram showing a functional construction of the image processing.

At step S205 shown in FIG. 14, a judgement is made whether the cloth employed for printing is fiber mixed or not on a basis of input information regarding a kind of the cloth. When the judgement is that cloth is not the fiber mixed cloth, a processing similar to the first embodiment is performed at steps S206, S210.

On the other hand, when the judgement is that the cloth is the fiber mixed one at step S205, adequate masking processes for the respective kinds of fibers are performed, and a selection of adequate γ conversion functions f(x) in a memory is performed in accordance with the kinds of fibers. Next, respective selected γ conversion functions f(x) are converted into γ conversion functions which are to be used for image processing, with a function α relating to the component ratio of respective fibers consisting the cloth and a function β relating to characteristics of other fiber of mixed fibers. A conversion equation is as follows.

$$f'(x) = \alpha \times \beta \times f(x)$$

wherein f'(x) is the γ conversion function after the above-described conversion.

Then, to image data which were processed through a density conversion, an under color removal and a black generation, γ conversion is applied with γ conversion function which are obtained by the above-stated equation at steps S223 and S224.

In concrete, in the case of obtaining the γ conversion function of cyan (c), taking account into a dyeing characteristic of nylon, the function βc relating to other fiber in cotton is determined so that, for example, a density of output image is higher than a value represented by an image data, and the function βn relating to other fiber in nylon is determined so that a density of output image is lower.

Particularly, the following performatory characteristics are required for the textile suitable for the ink jet textile printing:
(1) Colors should come out on ink in a sufficient density.
(2) Dye fixation factor is high for ink.
(3) Ink must be dried quickly.
(4) The generation of irregular ink spread is limited.
(5) Feeding can be conducted in an excellent condition in an apparatus.

In order to satisfy these requirements, it may be possible to give a preparatory treatment to the textile used for printing as required. In this respect, the textile having an ink receptacle layer is disclosed in Japanese Patent Application Laying-open No. 62-53492, for example. Also, in Japanese Patent Application Publication No. 3-46589, there are proposed the textile which contains reduction preventive agents or alkaline substances. As an example of such preparatory treatment as this, it is also possible to name a process to allow the textile to contain a substance selected from an alkaline substance, water soluble polymer, synthetic polymer, water soluble metallic salt, or urea and thiourea.

As an alkaline substance, there can be named, for example, hydroxide alkali metals such as sodium hydroxide, potassium hydroxide; mono-, di-, and tori-ethanol amine, and other amines; and carbonate or hydrogen carbonate alkali metallic salt such as sodium carbonate, potassium carbonate, and sodium hydrogen carbonate. Furthermore, there are organic acid metallic salt such as calcium carbonate, barium carbonate or ammonia and ammonia compounds. Also, there can be used the sodium trichloroacetic acid and the like which become an alkaline substance by steaming and hot air treatment. For the alkaline substance which is particularly suitable for the purpose, there are the sodium carbonate and sodium hydrogen carbonate which are used for dye coloring of the reactive dyestuffs.

As a water soluble polymer, there can be named starchy substances such as corn and wheat; cellulose substances such as carboxyl methyl cellulose, methyl cellulose, hydroxy ethel cellulose; polysaccharide such as sodium alginic acid, gum arabic, locasweet bean gum, tragacanth gum, guar gum, and tamarind seed; protein substances such as gelatin and casein; and natural water soluble polymer such as tannin and lignin.

Also, as a synthetic polymer, there can be named, for example, polyvinyl alcoholic compounds, polyethylene oxide compounds, acrylic acid water soluble polymer, maleic anhydride water soluble polymer, and the like. Among them, polysaccharide polymer and cellulose polymer should be preferable.

As a water soluble metallic salt, there can be named the pH4 to 10 compounds which produce typical ionic crystals, namely, halogenoid compounds of alkaline metals or alkaline earth metals, for example. As a typical example of these compounds, NaCl, $Na_2SO_4$, KCl and $CH_3$COONa and the like can be named for the alkaline metals, for example. Also, $CaCl_2$, $MgCl_2$, and the like can be named for the alkaline earth metals. Particularly, salt such as Na, K and Ca should be preferable.

In the preparatory process, a method is not necessarily confined in order to enable the above-mentioned substances and others to be contained in the textile. Usually, however, a dipping method, padding method, coating method, spraying method, and others can be used.

Moreover, since the printing ink used for the ink jet textile printing merely remains to adhere to the textile when printed, it is preferable to perform a subsequent reactive fixation process (dye fixation process) for the dyestuff to be fixed on the textile. A reactive fixation process such as this can be a method publicly known in the art. There can be named a steaming method, HT steaming method, and thermofixing method, for example. Also, alkaline pad steaming method, alkaline blotch steaming method, alkaline shock method, alkaline cold fixing method, and the like can be named when a textile is used without any alkaline treatment given in advance.

Further, the removal of the non-reactive dyestuff and the substances used in the preparatory process can be conducted by a rinsing method which is publicly known subsequent to the above-mentioned reactive fixation process. In this respect, it is preferable to conduct a conventional fixing treatment together when this rinsing is conducted.

In this respect, the printed textile is cut in desired sizes after the execution of the above-mentioned post process. Then, to the cut off pieces, the final process such as stitching, adhesion, and deposition is executed for the provision of the finished products. Hence, one-pieces, dresses, neckties, swimsuits, aprons, scarves, and the like, and bed covers, sofa covers, handkerchiefs, curtains, book covers, room shoes, tapestries, table cloths, and the like are obtained. As the methods of machine stitch to make clothes and other daily needs, a widely known method can be used.

What is claimed is:

1. An ink-jet printing apparatus employing an ink-jet head ejecting an ink, for performing printing by ejecting the ink from the ink-jet head to a printing medium consisting of a plurality of component materials having different characteristics relative to the ink, said apparatus comprising:

a memory for storing image processing parameters corresponding to the component materials;

parameter generating means for generating a composite image processing parameter corresponding to the printing medium based on the image processing parameters respectively corresponding to the component materials which constitute the printing medium;

image processing means for processing an input image signal based on the composite image processing parameter generated by said parameter generating means; and a printing portion for driving the ink jet head based on the input image signal processed by said image processing means to perform printing.

2. An ink-jet printing apparatus as claimed in claim 1, wherein the printing medium is defined according to a component ratio of respective component materials in said printing medium.

3. An ink-jet printing apparatus as claimed in claim 2, wherein said parameter generating means generates the composite image processing parameter further based on a parameter depending upon characteristics of other component materials with respect to the ink, which characteristics are determined with respect to each of the plurality of component materials.

4. An ink-jet printing apparatus employing an ink-jet head ejecting an ink, for performing printing by ejecting the ink from the ink-jet head to a printing medium consisting of a plurality of component materials having different characteristics relative to the ink, said apparatus comprising:

image processing means for performing a process for converting an input image signal into an ejection signal for said ink-jet head;

a memory for storing an image processing parameter in said image processing means per each of component materials which can constitute the printing medium;

selection means for selecting respective image processing parameters for each of said plurality of component materials constituting the printing medium to be used in printing from the image processing parameters stored in said memory; and parameter generating means for generating a composite image processing parameter relating to the printing medium based on the respective image processing parameters selected by said selection means and a component ratio of respective component materials in the printing medium.

5. An ink-jet printing apparatus as claimed in claim 4, wherein said parameter generating means generates the composite image processing parameter further based on a parameter depending upon characteristics of other component materials with respect to the ink, which characteristics are determined with respect to each of a plurality of component materials.

6. An ink-jet printing apparatus employing an ink-jet head ejecting an ink, for performing printing by ejecting the ink from the ink-jet head to a printing medium, said apparatus comprising:

image processing means for performing a process for converting an input image signal into an ejection signal for said ink-jet head;

a memory for storing an image processing parameter in said image processing means per each of component materials which can constitute the printing medium;

judgement means for making judgement whether or not the printing medium to be used in printing consists of a plurality of component materials having different dyeing characteristics with respect to the ink;

selection means for selecting respective image processing parameters for each of the plurality of component materials constituting the printing medium to be used, from the image processing parameters stored in said memory, when said judgement means makes judgement that the printing medium consists of the plurality of component materials; and parameter generating means for generating a composite image processing parameter relating to said printing medium based on the respective image processing parameters selected by said selection means and a component ratio of respective component materials in the printing medium.

7. An ink-jet printing apparatus as claimed in claim 6, wherein said parameter generating means generates the composite image processing parameter further based on a parameter depending upon characteristics of other component materials with respect to the ink, which characteristics are determined with respect to each of the plurality of component materials.

8. An ink-jet printing apparatus as claimed in claim 7, wherein the component ratio of the plurality of component materials is a surface coverage ratio of the printing medium.

9. An ink-jet printing apparatus as claimed in claim 8, wherein the printing medium is a cloth and the component materials are fibers constituting the cloth.

10. An ink-jet printing apparatus as claimed in claim 9, wherein the component ratio of the plurality of component materials is a fiber mixture ratio of the fibers or mixing weaving ratio thereof.

11. An ink-jet printing apparatus as claimed in claim 10, wherein the input image signal comprises luminance data to which a masking process is applied of R, G and B, and said image processing means includes density data converting means for converting the luminance data into density data corresponding to the ink to be ejected by the ink-jet head, a masking portion for performing the masking process of the density data, and binarizing processing means for converting the density data to which the masking process is applied into the ejection signal.

12. An ink-jet printing apparatus as claimed in claim 11, wherein the image processing parameter is a masking coefficient of said masking portion.

13. An ink-jet printing apparatus as claimed in claim 12, wherein the ink-jet head generates a bubble in the ink utilizing thermal energy and ejects the ink by generation of the bubble.

14. An ink-jet printing apparatus as claimed in claim 10, wherein the input image signal comprises luminance data to which an input masking process is applied of R, G and B, and said image processing means includes density data converting means for converting the luminance data into density data corresponding to the ink to be ejected by the ink-jet head, a γ conversion portion for performing γ conversion of the density data, and binarizing processing means for converting the density data converted by said γ conversion portion into the ejection signal.

15. An ink-jet printing apparatus as claimed in claim 14, wherein the image processing parameter is a γ conversion function used in said γ conversion portion.

16. An ink-jet printing apparatus as claimed in claim 15, wherein the ink-jet head generates a bubble in the ink utilizing thermal energy and ejects the ink by generation of the bubble.

17. An ink-jet printing method employing an ink-jet head ejecting an ink, for performing printing by ejecting the ink from the ink-jet head to a printing medium, comprising the steps of:

preparing the printing medium;

making a judgement whether or not the printing medium consists of a plurality of component materials having different characteristics with respect to the ink;

performing image processing based on an image processing parameter determined with respect to each of the plurality of component materials and a component ratio of the plurality of component materials in the printing medium; and performing printing based on a result of the image processing.

18. An ink-jet printing apparatus as claimed in claim 1, wherein sid parameter generating means generates the composite image processing parameter corresponding to the printing medium in accordance with a component ratio of a plurality of component materials constituting said printing medium.

19. An ink-jet printing apparatus as claimed in claim 1, wherein the printing medium is a cloth, said memory stores the image processing parameters corresponding to kinds of fibers constituting the cloth, and said parameter generating means generates the composite image processing parameter corresponding to a mixed fiber based on a plurality of image processing parameters respectively corresponding to a plurality of fibers constituting the mixed fiber which forms the cloth.

20. An ink-jet printing apparatus as claimed in claim 19, wherein said parameter generating means generates the composite processing parameter corresponding to the mixed fiber in accordance with a component ratio of a plurality of fibers constituting the mixed fiber.

21. An ink-jet printing apparatus as claimed in claim 1, wherein the ink-jet head utilizes thermal energy to eject the ink.

22. An ink-jet printing apparatus as claimed in claim 4, wherein the printing medium is a cloth, said memory stores the image processing parameters corresponding to kinds of fibers constituting the cloth, and said parameter generating means generates the composite image processing parameter corresponding to a mixed fiber based on a plurality of image processing parameters respectively corresponding to a plurality of fibers constituting the mixed fiber which forms the cloth.

23. An ink-jet printing apparatus as claimed in claim 22, wherein said parameter generating means generates the composite image processing parameter corresponding to the mixed fiber in accordance with a component ratio of the plurality of fibers constituting the mixed fiber.

24. An ink-jet printing apparatus as claimed in claim 4, wherein the ink-jet head utilizes thermal energy to eject the ink.

25. An ink-jet printing method as claimed in claim 17, wherein the ink-jet head utilizes thermal energy to eject the ink.

26. An ink-jet printing method employing an ink-jet head ejecting an ink, for performing printing by ejecting the ink from the ink-jet head to a printing medium, comprising the steps of:

generating a composite image processing parameter corresponding to the printing medium based on image processing parameters corresponding to a plurality of component materials constituting the printing medium and read from a memory storing the image processing parameters corresponding to the component materials;

processing an input image signal based on the composite image processing parameter generated in said generating step; and performing printing by driving the ink-jet based on the input image signal processed in said processing step.

27. An ink-jet printing method as claimed in claim 26, wherein the ink-jet head utilizes thermal energy to eject the ink.

\* \* \* \* \*

UNITED STATES PATENT AND TRADEMARK OFFICE
CERTIFICATE OF CORRECTION

PATENT NO. : 5,877,797
DATED : March 2, 1999
INVENTOR(S) : MIYASHITA ET AL.

It is certified that error appears in the above-identified patent and that said Letters Patent is hereby corrected as shown below:

On the title page, item

[56] References Cited:
    FOREIGN PATENT DOCUMENTS, "3046589" should read --3-046589--.
    "7117223" should read --7-117223--.

ABSTRACT:
    Line 1, "of a" should read --a--.

COLUMN 1:
    Line 15, "continues" should read --continuous---.

COLUMN 2:
    Line 13, "are naturally arisen" should read --naturally arise--.
    Line 14, "are risen" should read --arise--.

COLUMN 5:
    Line 1, "embodiment" should read --embodiments--.
    Line 55, "EMBODIMENT" should read --EMBODIMENTS--.
    Line 57, "embodiment" should read --embodiments--.

UNITED STATES PATENT AND TRADEMARK OFFICE
CERTIFICATE OF CORRECTION

PATENT NO.   : 5,877,797
DATED        : March 2, 1999
INVENTOR(S)  : MIYASHITA ET AL.

It is certified that error appears in the above-identified patent and that said Letters Patent is hereby corrected as shown below:

COLUMN 9:
    Line 31, "connected" should read --is connected--.
    Line 32, "2,2'via" should read --2,2' via--.

COLUMN 11:
    Line 10, "prepared an" should read --prepared by an--.

COLUMN 15:
    Line 63, "stores" should read --store--.

COLUMN 16:
    Line 60, "$\alpha_c$" should read --$\alpha c$--.
    Line 62, "to a" should read --to--.

COLUMN 17:
    Line 54, "weaken" should read --weakened--.
    Line 55, "strengthen" should read --strengthening--.

COLUMN 18:
    Line 42, "to" should read --to be--.

UNITED STATES PATENT AND TRADEMARK OFFICE
CERTIFICATE OF CORRECTION

PATENT NO. : 5,877,797
DATED : March 2, 1999
INVENTOR(S) : MIYASHITA ET AL.

It is certified that error appears in the above-identified patent and that said Letters Patent is hereby corrected as shown below:

COLUMN 19:
    Line 14, "consisting" should read --comprising--.
    Line 27, "account into" should read --into account--.

COLUMN 21:
    Line 6, "ink let" should read --ink-jet--.

COLUMN 23:
    Line 9, "sid" should read --said--.

COLUMN 24:
    Line 29, "ink-jet" should read --ink-jet head--.

Signed and Sealed this

Eighteenth Day of January, 2000

Attest:

Q. TODD DICKINSON

*Attesting Officer*      *Commissioner of Patents and Trademarks*